United States Patent
Hoshihara et al.

(10) Patent No.: US 8,954,223 B2
(45) Date of Patent: Feb. 10, 2015

(54) CHARGE GUIDANCE APPARATUS AND ONBOARD NAVIGATION SYSTEM

(75) Inventors: Yasunori Hoshihara, Tokyo (JP); Kazuyuki Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 25 days.

(21) Appl. No.: 13/882,444

(22) PCT Filed: Jan. 28, 2011

(86) PCT No.: PCT/JP2011/000473
§ 371 (c)(1),
(2), (4) Date: Apr. 29, 2013

(87) PCT Pub. No.: WO2012/101681
PCT Pub. Date: Aug. 2, 2012

(65) Prior Publication Data
US 2013/0218402 A1    Aug. 22, 2013

(51) Int. Cl.
*B60L 11/18* (2006.01)
*G01C 21/26* (2006.01)
(Continued)

(52) U.S. Cl.
CPC ......... *B60L 11/1861* (2013.01); *B60L 11/1838* (2013.01); *B60L 3/12* (2013.01); *G01C 21/3469* (2013.01); *G01C 21/3484* (2013.01);
(Continued)

(58) Field of Classification Search
CPC ... B60L 11/1838; B60L 3/12; B60L 2260/46; B60L 2260/50; B60L 2250/00; B60L 11/1861; B60L 2240/72; G01C 21/26; G01C 21/3469; G01C 21/3484; Y02T 10/7005; Y02T 90/14; Y02T 90/128; Y02T 90/163
USPC ........................................................ 701/32.3
See application file for complete search history.

(56) References Cited

U.S. PATENT DOCUMENTS

| 5,521,443 A | 5/1996 | Imura et al. |
| 2012/0065831 A1* | 3/2012 | Ross et al. ................... 701/29.1 |
| 2012/0158229 A1 | 6/2012 | Schaefer |

FOREIGN PATENT DOCUMENTS

| JP | 7-111702 A | 4/1995 |
| JP | 2003-209901 A | 7/2003 |

(Continued)

*Primary Examiner* — Mary Cheung
*Assistant Examiner* — Brian P Sweeney
(74) *Attorney, Agent, or Firm* — Birch, Stewart, Kolasch & Birch, LLP

(57) ABSTRACT

A charge guidance apparatus includes a history creation retaining unit 23 for creating history information about a charging spot, charge start time and charging duration of a battery 14 of a vehicle 1; a learning processing unit 24 for learning a usual charging spot and charging period of time of the vehicle 1 from the charging spot, charge start time and charging duration of the battery 14 of the vehicle 1 with the frequency of charges executed being not less than a prescribed number of times, which are extracted from the history information; a decision processing unit 25 for deciding whether to give charge guidance or not based on whether the vehicle 1 is in the usual charging spot and charging period of time; and a charge guidance processing unit 26 for giving charge guidance in accordance with a decision result of the decision processing unit 25.

20 Claims, 18 Drawing Sheets

(51) Int. Cl.
*B60L 3/12* (2006.01)
*G01C 21/34* (2006.01)

(52) U.S. Cl.
CPC .............. *G01C 21/26* (2013.01); *B60L 2240/72* (2013.01); *Y02T 10/7005* (2013.01); *Y02T 90/128* (2013.01); *Y02T 90/14* (2013.01); *Y02T 90/163* (2013.01); *B60L 2260/46* (2013.01); *B60L 2260/50* (2013.01); *B60L 2250/00* (2013.01); *Y02T 10/7088* (2013.01); *Y02T 90/161* (2013.01)
USPC ....................................................... 701/32.3

(56) References Cited

FOREIGN PATENT DOCUMENTS

| | | |
|---|---|---|
| JP | 2004-266898 A | 9/2004 |
| JP | 2008-100646 A | 5/2008 |
| JP | 2008-253072 A | 10/2008 |
| JP | 2010-101854 A | 5/2010 |
| JP | 2010-110068 A | 5/2010 |
| JP | 102009016869 A1 | 10/2010 |
| JP | 102010007851 A1 | 12/2010 |
| WO | WO 2010/049779 A1 | 5/2010 |

\* cited by examiner

CHARGE GUIDANCE APPARATUS AND ONBOARD NAVIGATION SYSTEM

TECHNICAL FIELD

The present invention relates to a charge guidance apparatus and an onboard navigation system, wherein the charge guidance apparatus carries out battery charge guidance of an electric vehicle or the like.

BACKGROUND ART

Recently, electric vehicles which travel by driving a motor by battery power have been put to practical use and spread. As present battery charge methods, methods are known which charge from a dedicated boosting charge station for batteries of electric vehicles or from a home-use AC power supply. As for charging duration, it is generally said that it takes about 30 minutes for a dedicated boosting charge station and 8 or more hours for a home-use AC power supply to complete charging. At present, the range of an electric vehicle is shorter than that of a gasoline-engine car. Accordingly, a battery of an electric vehicle must be recharged appropriately with enough time.

The battery charge of an electric vehicle is usually carried out by an operation of a driver. For example, a driver decides whether to charge the battery or not considering a traveling schedule thereafter by viewing a remaining battery life display and carries out charging. In this case, if the driver carelessly failed to notice the remaining battery life display and a shortage of the remaining battery life is found just before traveling, there are some cases of giving up the traveling.

Considering this, Patent Document 1, for example, proposes an electric vehicle in which a charge request means prompts the driver to recharge according to the remaining battery life after ending the travel by turning off the start switch of the driving motor. In addition, as a method of reminding to recharge, it discloses a method of providing the driver not only with a display with an indicator but also with an alarm sound or voice guidance.

PRIOR ART DOCUMENT

Patent Document

Patent Document 1: Japanese Patent Laid-Open No. 2003-209901.

DISCLOSURE OF THE INVENTION

Problems to be Solved by the Invention

A conventional technique typified by the Patent Document 1 reminds the driver to charge according to the remaining battery life detected at the end of travel of the electric vehicle. Accordingly, it is not unlikely that a request to charge can be made even if there is not a battery charge facility at a place where the vehicle is parked after traveling. In this case, the charge request to the driver is ineffective.

In addition, even if the driver perceives the necessity of charging by the notification, if the battery charge cannot be completed successfully because of forgetting connection of a charge cable or a failure in the operational setting of a charging facility, a shortage of the remaining battery life is found just before the next driving, thereby bringing about malfunctioning just as when the charging request is not make.

Accordingly, it is necessary to appropriately charge the battery without bringing any harm to traveling of an electric vehicle.

The present invention is implemented to solve the foregoing problems. Therefore it is an object of the present invention to provide a charge guidance apparatus and an onboard navigation system, which are able to give notification or guidance appropriately for enabling battery charge of the electric vehicle without fail.

Means for Solving the Problem

A charge guidance apparatus in accordance with the present invention comprises: a history creation unit for creating history information about a charging spot, charge start time and charging duration of a driving battery of a vehicle; a learning processing unit for extracting the charging spot, charge start time and charging duration of the driving battery of the vehicle with frequency of charges executed being not less than a prescribed number of times from the history information created by the history creation unit, and for learning a usual charging spot and charging period of time of the vehicle from the charging spot, charge start time and charging duration extracted; a decision processing unit for deciding whether to give charge guidance or not based on whether the vehicle is in the usual charging spot and charging period of time learned by the learning processing unit; and a charge guidance processing unit for giving charge guidance in accordance with a decision result of the decision processing unit.

Advantages of the Invention

According to the present invention, since it can give a driver and passenger of a vehicle such as an electric vehicle appropriate guidance on charging a driving battery, it offers an advantage of being able to provide a vehicle with a driving environment enabling traveling without the trouble due to charging shortage.

BEST MODE FOR CARRYING OUT THE INVENTION

The best mode for carrying out the invention will now be described with reference to the accompanying drawings to explain the present invention in more detail.

Embodiment 1

Figure 1:
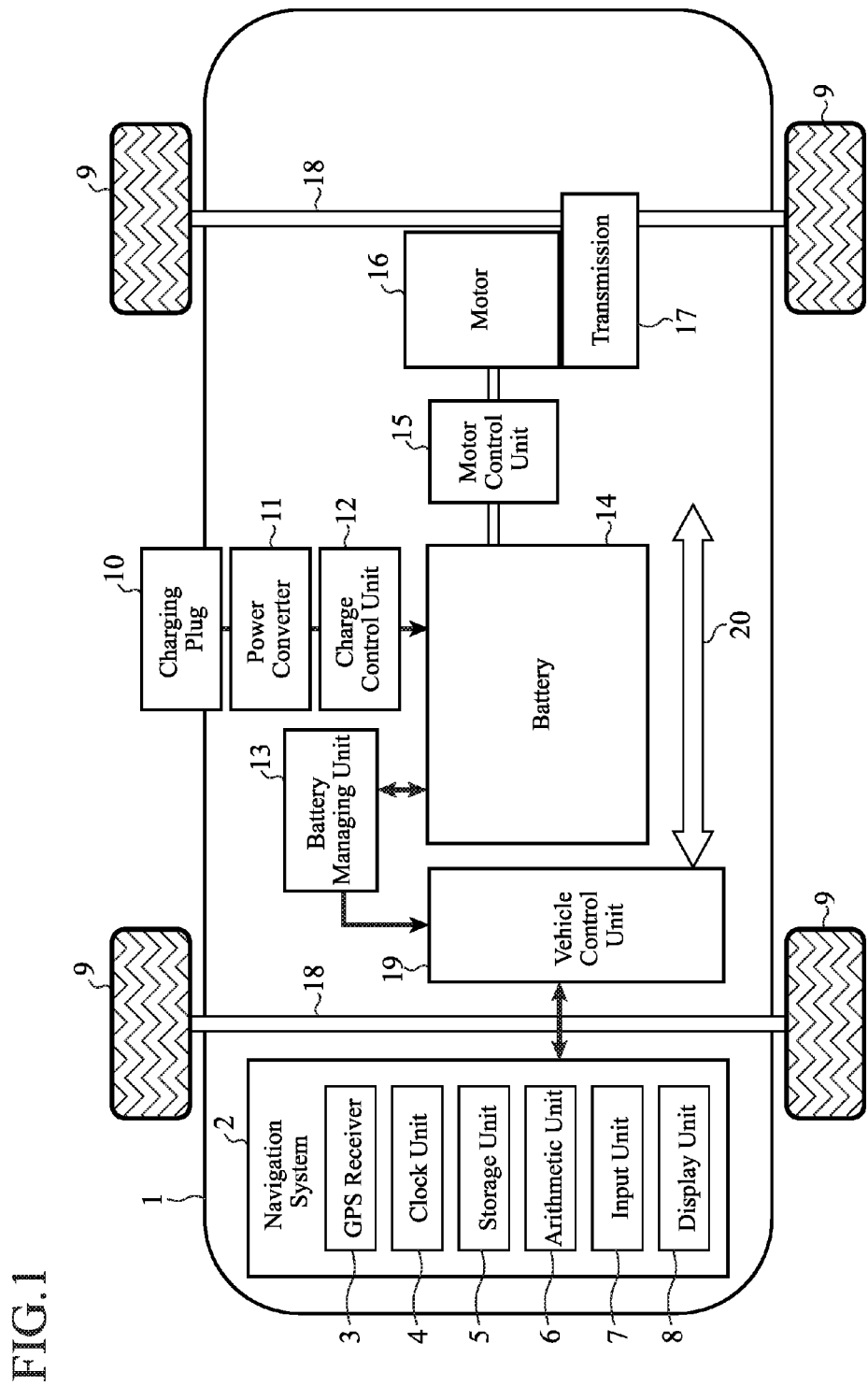
FIG. 1 is a block diagram showing a configuration of a navigation system to which a charge guidance apparatus of an embodiment 1 in accordance with the present invention is applied and an electric vehicle incorporating the navigation system.

FIG. 1 is a block diagram showing a configuration of a navigation system to which a charge guidance apparatus of an embodiment 1 in accordance with the present invention is applied and an electric vehicle incorporating the navigation system. In FIG. 1, the body 1 of an electric vehicle incorporating a navigation system 2 comprises a vehicle control unit 19 and an in-vehicle control bus 20 as components of a control system; comprises a battery 14, a motor control unit 15, a motor 16 and a transmission 17 as components of a driving system for driving wheels 9 via a shaft 18; and comprises a charging plug 10, a power converter 11, a charge control unit 12 and a battery managing unit 13 as components for charging or discharging the battery 14. In addition, the navigation system 2 comprises a GPS (Global Positioning System) receiver 3, a clock unit 4, a storage unit 5, an arithmetic unit 6, an input unit 7 and a display unit 8.

First, driving of the electric vehicle will be described while considering the power flow in the car body 1.

The motor 16 which is supplied with the power stored in the battery 14 converts the power to a driving force of the electric vehicle. More specifically, the motor control unit 15 controls the amount of power to be supplied from the battery 14 to the motor 16 in accordance with the control information corresponding to the driving of a driver such as acceleration or deceleration transmitted from the vehicle control unit 19 via the vehicle control bus 20. The motor 16 which is supplied with the power from the battery 14 via the motor control unit 15 converts the power to the driving force and transfers to the shaft 18 via the transmission 17, thereby driving the wheels 9 connected to the shaft 18. Here, the battery 14 reduces its storage power as the motor 16 uses the power. Accordingly, to continue the power supply to the motor 16 by supplying the storage power reduced, it is necessary for the battery 14 to be recharged from an external power supply.

The recharge of the battery 14 by the external power supply is carried out by connecting to the charging plug 10 a dedicated charging cable for transferring the power from the external power supply. As for the charging voltage and power capacity of the external power supply, they sometimes differ depending on the external power supply. For example, when charging in the home, the external power supply is a commercial AC power supply, whereas at a dedicated charging station of an electric vehicle, the external power supply is sometimes a DC power supply. The power converter 11 converts the power supplied from such an external power supply to a voltage (charging voltage) required for the charge of the battery 14. The battery 14 is charged at the optimum charging voltage after the conversion by the power converter 11 and at the charging current optimized by the charge control unit 12.

In addition, the state of the battery 14 is managed by the battery managing unit 13. Here, the battery managing unit 13 detects the residual storage power by observing the battery voltage and detects a failure of the battery 14, and manages the charging state of the battery 14. The management information obtained by the battery managing unit 13 is sent to the vehicle control unit 19 and is transferred from the vehicle control unit 19 to the navigation system 2.

The navigation system 2, to which the charge guidance apparatus of the embodiment 1 is applied, comprises the GPS receiver 3, clock unit 4, storage unit 5, arithmetic unit 6, input unit 7 and display unit 8.

The GPS receiver 3 is a component for acquiring its own vehicle position information from the GPS information received from GPS satellites. The clock unit 4 is a component for acquiring the present time and the elapsed time from a particular point of time from the GPS information received by the GPS receiver 3 and from the timing information from the timer of the clock unit.

The storage unit 5, which is installed in the navigation system 2 or outside the system, is a storage unit for storing the charging spot of the battery 14, the history information that proves the charge start time and charging duration, and the usual charging spot, charge start time and charging duration of the battery 14 of the vehicle, which are learned from the history information.

The arithmetic unit 6, which carries out calculations of the individual processing in the navigation system 2, estimates the usual charging spot, charge start time and charging duration taken for the charge of the battery 14, for example, and retains them in the storage unit 5 as a learning result.

The input unit 7 is a device that accepts information input from the outside, and the display unit 8 is a device for displaying route guidance contents of the navigation processing. Instead of the input unit 7, an HMI (Human Machine Interface) can be constructed by placing a touch screen on the screen of the display unit 8.

Figure 2:
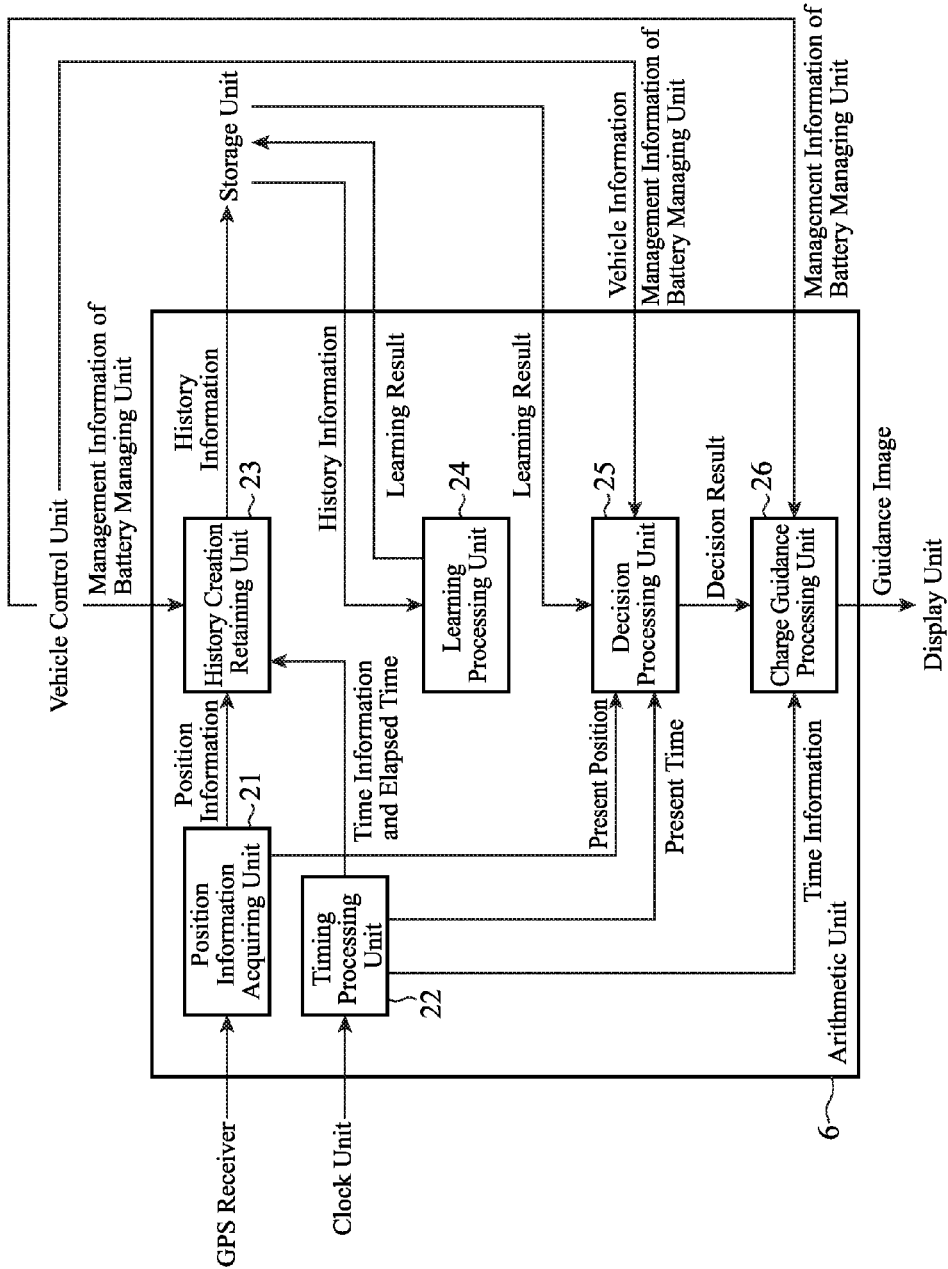
FIG. 2 is a block diagram showing a configuration of the arithmetic unit in FIG. 1.

FIG. 2 is a block diagram showing a configuration of the arithmetic unit in FIG. 1. In FIG. 2, the arithmetic unit 6 comprises a position information acquiring unit 21, a timing processing unit 22, a history creation retaining unit 23, a learning processing unit 24, a decision processing unit 25 and a charge guidance processing unit 26. Incidentally, the position information acquiring unit 21, timing processing unit 22, history creation retaining unit 23, learning processing unit 24, decision processing unit 25 and charge guidance processing unit 26 are implemented as concrete means which cause software and hardware to cooperate to execute charge guidance processing programs conforming to the purposes of the present invention by the arithmetic unit 6 which is a computer for realizing the navigation system 2, for example.

The position information acquiring unit 21 is a component for acquiring the position information of the vehicle the GPS receiver 3 extracts from the GPS information, and supplies the position information acquired to the history creation retaining unit 23.

The timing processing unit 22 is a component for acquiring from the clock unit 4 the time information and the elapsed time from a particular point of time, and supplies the time information and the elapsed time acquired to the history creation retaining unit 23.

The history creation retaining unit 23 is a component for detecting a start of the charge of the battery 14 from the management information of the battery managing unit 13, for creating the history information on the charge of the battery 14 from the position information, time information and elapsed time from that time, which are input at the start of the charge, and for retaining the history information in the storage unit 5.

The learning processing unit 24 is a component for estimating from the history information stored in the storage unit 5 the charging spot where the battery 14 is usually charged, the charge start time and charging duration required for the charge of the vehicle, and for retaining the estimated contents in the storage unit 5 as a learning result about the charging of the vehicle.

The decision processing unit 25 is a component for deciding whether to give charge guidance about the battery 14 or not from the present position of the vehicle, the present time and the learning result about the charge of the vehicle and from the vehicle information and the management information of the battery managing unit 13.

The charge guidance processing unit 26 is a component for executing the charge guidance in accordance with the decision result as to whether to give the charge guidance or not by the decision processing unit 25. In addition, the charge guidance processing unit 26 obtains from the management information of the battery managing unit 13 the elapsed time from the charge guidance it executes, and provides the charge guidance newly if the charge is not started even if a prescribed time period has elapsed.

Figure 3:
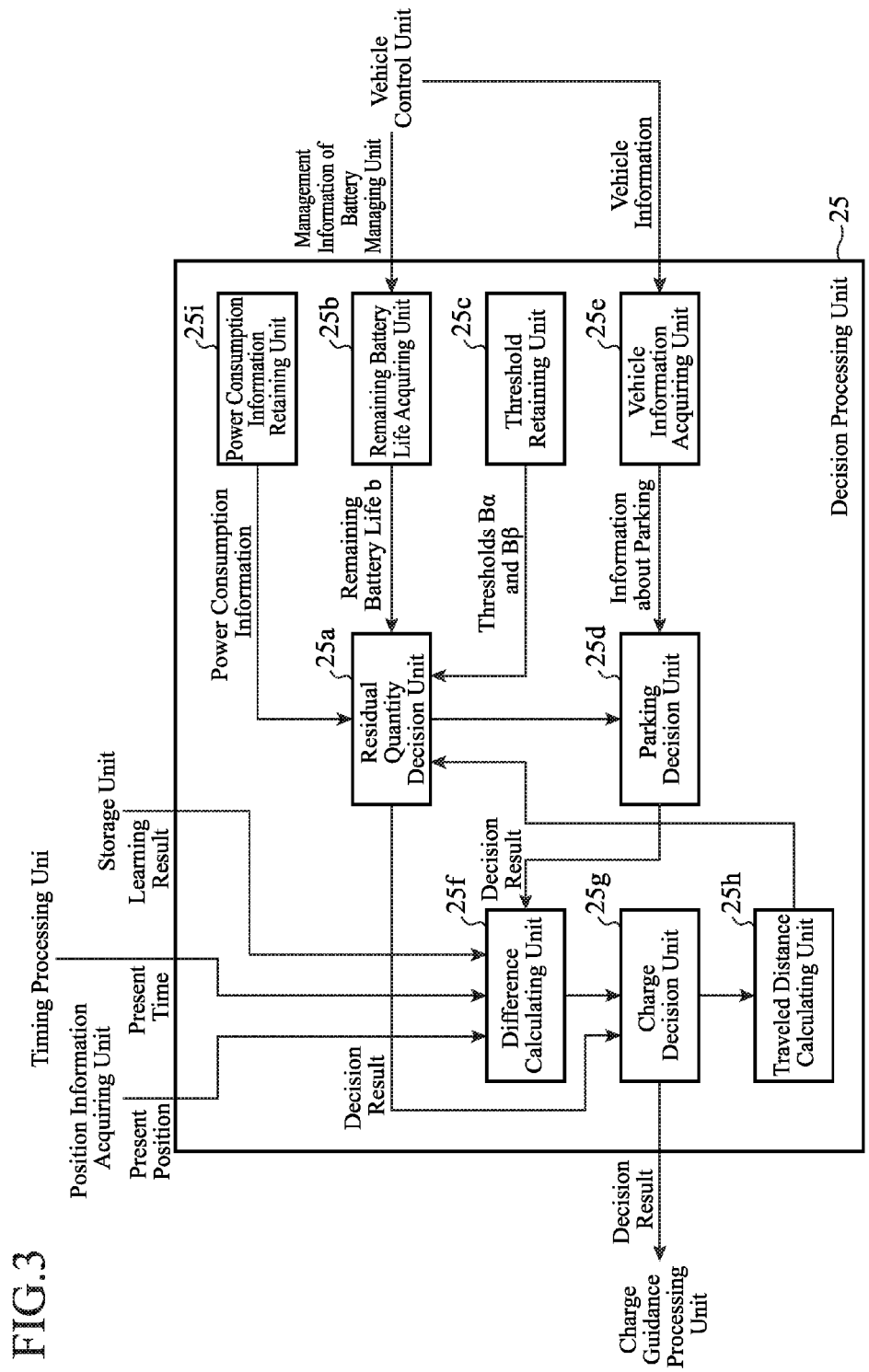
FIG. 3 is a block diagram showing a configuration of the decision processing unit in FIG. 2.

FIG. 3 is a block diagram showing a configuration of the decision processing unit in FIG. 2. In FIG. 3, the decision processing unit 25 comprises a residual quantity decision unit 25a, a remaining battery life acquiring unit 25b, a threshold retaining unit 25c, a parking decision unit 25d, a vehicle information acquiring unit 25e, a difference calculating unit 25f, a charge decision unit 25g, a traveled distance calculating unit 25h and a power consumption information retaining unit 25i.

The residual quantity decision unit 25a is a component for comparing the remaining battery life b, which is the present residual power of the battery 14, with prescribed thresholds Bα and Bβ, and for notifying the parking decision unit 25d of the compared result. In addition, the residual quantity decision unit 25a decides on whether the vehicle can arrive at the usual charging spot of the battery 14 or not from the power consumption information read out of the power consumption information retaining unit 25i, from the distance covered by the vehicle calculated by the traveled distance calculating unit 25h and from the present remaining battery life b, and supplies the decision result to the charge decision unit 25g.

The remaining battery life acquiring unit 25b, which is a component for receiving the management information of the battery managing unit 13, acquires the remaining battery life b of the battery 14 from the management information. The threshold retaining unit 25c is a storage unit for retaining the threshold Bα and threshold Bβ. Here, the threshold Bα is a value (the upper limit) indicating the remaining battery level at which the battery 14 must be charged immediately to continue the current traveling of the vehicle without hindrance. On the other hand, the threshold Bβ is a value (the upper limit) indicating the remaining battery level with which the vehicle can continue a predetermined middle distance traveling though it cannot achieve a predetermined long distance traveling.

The parking decision unit 25d is a component for deciding on whether the vehicle is parking or not from the information about parking received from the vehicle information acquiring unit 25e. The vehicle information acquiring unit 25e acquires the vehicle information about the vehicle from the vehicle control unit 19, identifies the information about parking indicating whether the vehicle is parking or not from the vehicle information, and supplies it to the parking decision unit 25d. As the information about parking, there is vehicle speed information determined by vehicle speed pulses from the vehicle speed sensor, or detection information indicating whether the brake is applied or not acquired from a sensor mounted on the parking brake, for example.

The difference calculating unit 25f is a component for calculating the difference of the time at which the parking decision unit 25d decides that the vehicle is parking and the difference of the position information of the vehicle at that time from the learning result about the usual charge start time and charging spot of the battery 14 of the vehicle, which is read out of the storage unit 5.

The charge decision unit 25g is a component for deciding from the difference information calculated by the difference calculating unit 25f as to whether the present position where the vehicle is parking is the usual charging spot or not, for deciding as to whether the present time at which the vehicle is parking is within a prescribed time period before the usual charge start time, and for deciding whether to provide the charge guidance or not in accordance with the decision result. In addition, even if the vehicle is not at the usual charging spot, the charge decision unit 25g decides whether to give charge guidance or not from a decision result as to whether the remaining battery life b enables traveling to the charging spot obtained by the residual quantity decision unit 25a or not.

The traveled distance calculating unit 25h receives the difference information calculated by the difference calculating unit 25f via the charge decision unit 25g, and calculates from the difference information the distance to be covered from the parking position of the vehicle to the usual charging spot. The power consumption information retaining unit 25i is a storage unit for retaining the power consumption information that indicates the amount of power (%) of the battery 14 consumed per unit traveled distance of the vehicle.

Incidentally, the residual quantity decision unit 25a, remaining battery life acquiring unit 25b, threshold retaining unit 25c, parking decision unit 25d, vehicle information acquiring unit 25e, difference calculating unit 25f, charge decision unit 25g, traveled distance calculating unit 25h and power consumption information retaining unit 25i are implemented as concrete means which cause software and hardware to cooperate to execute program modules corresponding to the functions of the foregoing components in the charge guidance processing programs by the arithmetic unit 6 which is a computer for realizing the navigation system 2, for example.

Figure 4:
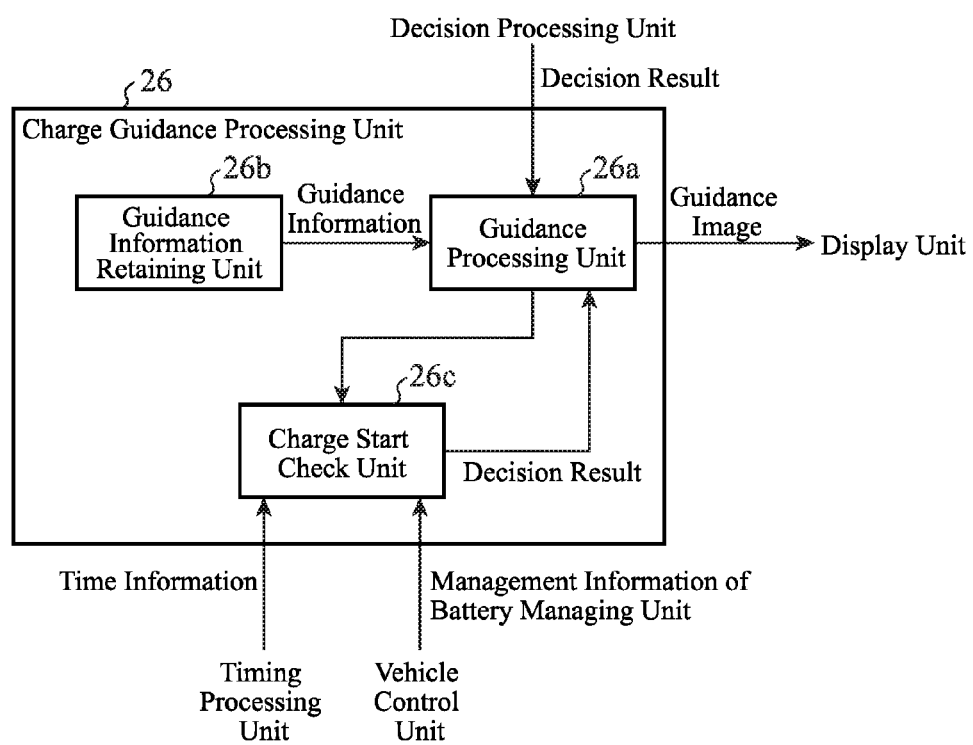
FIG. 4 is a block diagram showing a configuration of the charge guidance processing unit in FIG. 2.

FIG. 4 is a block diagram showing a configuration of the charge guidance processing unit in FIG. 2. In FIG. 4, the charge guidance processing unit 26 comprises a guidance processing unit 26a, a guidance information retaining unit 26b and a charge start check unit 26c. The guidance processing unit 26a is a component for carrying out charge guidance in accordance with the decision result by the decision processing unit 25. FIG. 4 shows a case where it creates a guidance image from the guidance information read out of the guidance information retaining unit 26b and displays a guidance screen on the display unit 8. In addition, receiving the decision result from the charge start check unit 26c that the charge is not yet started even though a prescribed time has elapsed after the charge guidance, the guidance processing unit 26a carries out the charge guidance again.

The guidance information retaining unit 26b is a storage unit for retaining the guidance information indicating the contents of the charge guidance. The contents of the charge guidance includes a guidance message prompting charging and layout information on the guidance screen.

The charge start check unit 26c is a component for deciding from the time information successively supplied from the timing processing unit 22 and the management information from the battery managing unit 13 as to whether the battery charge is started or not before the prescribed time has elapsed after the guidance processing unit 26a carries out the charge guidance.

Incidentally, the guidance processing unit 26a, guidance information retaining unit 26b and charge start check unit 26c are implemented as concrete means which cause software and hardware to cooperate to execute program modules corresponding to the functions of the foregoing components in the charge guidance processing programs by the arithmetic unit 6 which is a computer for realizing the navigation system 2, for example.

Next, the operation will be described.

Figure 5:
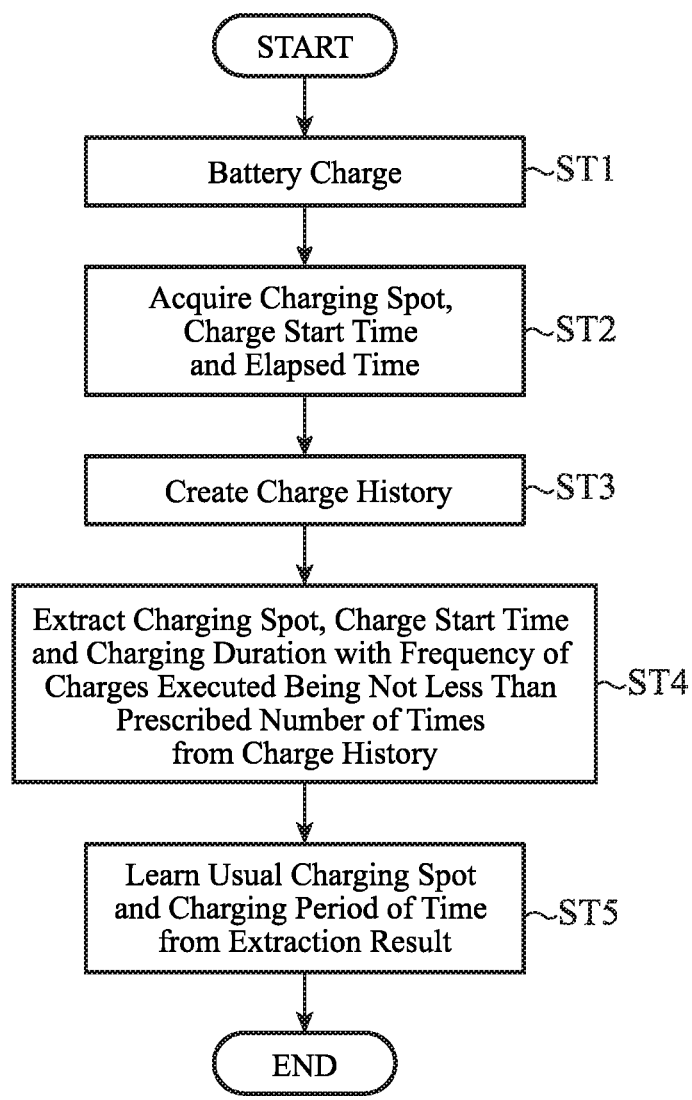
FIG. 5 is a flowchart showing a flow of charge history creation processing and learning processing about a usual charging spot by the charge guidance apparatus of the embodiment 1.

FIG. 5 is a flowchart showing a flow of the charge history creation processing and learning processing about the usual charging spot by the charge guidance apparatus of the embodiment 1. First, it starts the charge of the battery 14 of the vehicle (step ST1). At this point, the history creation retaining unit 23 of arithmetic unit 6 detects from the management information of the battery managing unit 13 that the charge of the battery 14 has been started, and acquires the position information of the vehicle at that point from the position information acquiring unit 21 and the time information at which the charge of the battery 14 is started and the elapsed time from that point of time from the timing processing unit 22 (step ST2). Next, when the history creation retaining unit 23 detects that the charge of the battery 14 has been completed from the management information of the battery managing unit 13, it creates the history information containing the present charging spot, the charge start time and the elapsed time (charging duration) from the start time and retains it in the storage unit 5 (step ST3). The history information is created every time the battery 14 is charged.

After that, at every prescribed time period or if a prescribed number of pieces of the history information have been stored in the storage unit 5, for example, the learning processing unit 24 reads out the history information stored in the storage unit 5, and extracts the charging spot at which the frequency of executing the charging processing is not less than a prescribed number of times, its charge start time and the charging duration required (step ST4). Incidentally, a configuration is also possible which displays on the display unit 8 a selection screen for selecting the charging spot at which the frequency of executing the charging processing is not less than the prescribed number of times, its charge start time, and the charging duration required to provide an HMI for causing a user to select the charging spot, charge start time and charging duration using the input unit 7, so that the user can select the appropriate charging spot, charge start time and charging duration.

According to the present invention, considering a range in which the charging cable can be drawn from the charging facility and considering the accuracy of the positioning of the GPS, the foregoing frequency is calculated by considering a charging spot within a range of a prescribed position error, within about five meters, for example, from a spot among the past charging spots in the history information, as the same charging spot.

Furthermore, among the past charge start times in the history information, a charge start time within a range of a prescribed time difference, such as about 30 minutes, is considered as the same charge start time.

The learning processing unit 24 learns the usual charging spot and charging period of time from the extraction result at step ST4 (step ST5). For example, among the extraction results, the charging spot with the highest frequency of executing the charging processing can be selected as the usual charging spot, and the period of time from the charge start time to the charge end time with the highest frequency of executing the charging processing can be selected as the usual charging period of time.

In addition, it is also possible to select the most probable usual spot and period of time of charging by statistically processing the charging spot at which the frequency of executing the charging processing is higher than the prescribed number of times, its charge start time and charging duration required.

Incidentally, as for the usual charging spot according to the present invention, it is not limited to a single place for each vehicle, but can be a plurality of spots. Alternatively, it can be within a certain range such a parking lot where a plurality of vehicles can park at random.

Figure 6:
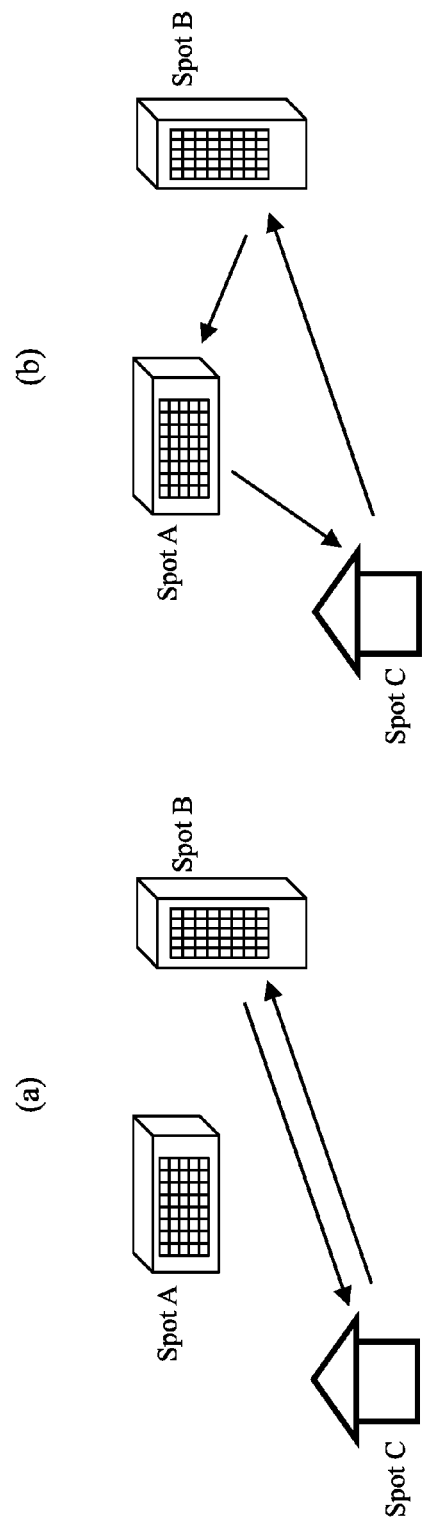
FIG. 6 is a diagram showing an example of a visiting spot of an electric vehicle.

FIG. 6 is a diagram showing an example of a visiting spot of an electric vehicle. FIG. 6(a) shows a usual visiting spot of a driver, and FIG. 6(b) shows an occurrence of unusual visiting. In FIG. 6, the driver usually drives the electric vehicle to travel between spot C and spot B (see FIG. 6(a)). For example, consider a case where the user travels back and forth to work by electric vehicle, in which spot B is user's workplace and spot C is user's home. Not as usual, FIG. 6(b) shows a case where the user visits spot A. For example, the user leaves the workplace spot B, visits spot A and then goes back home spot C.

Figure 7:
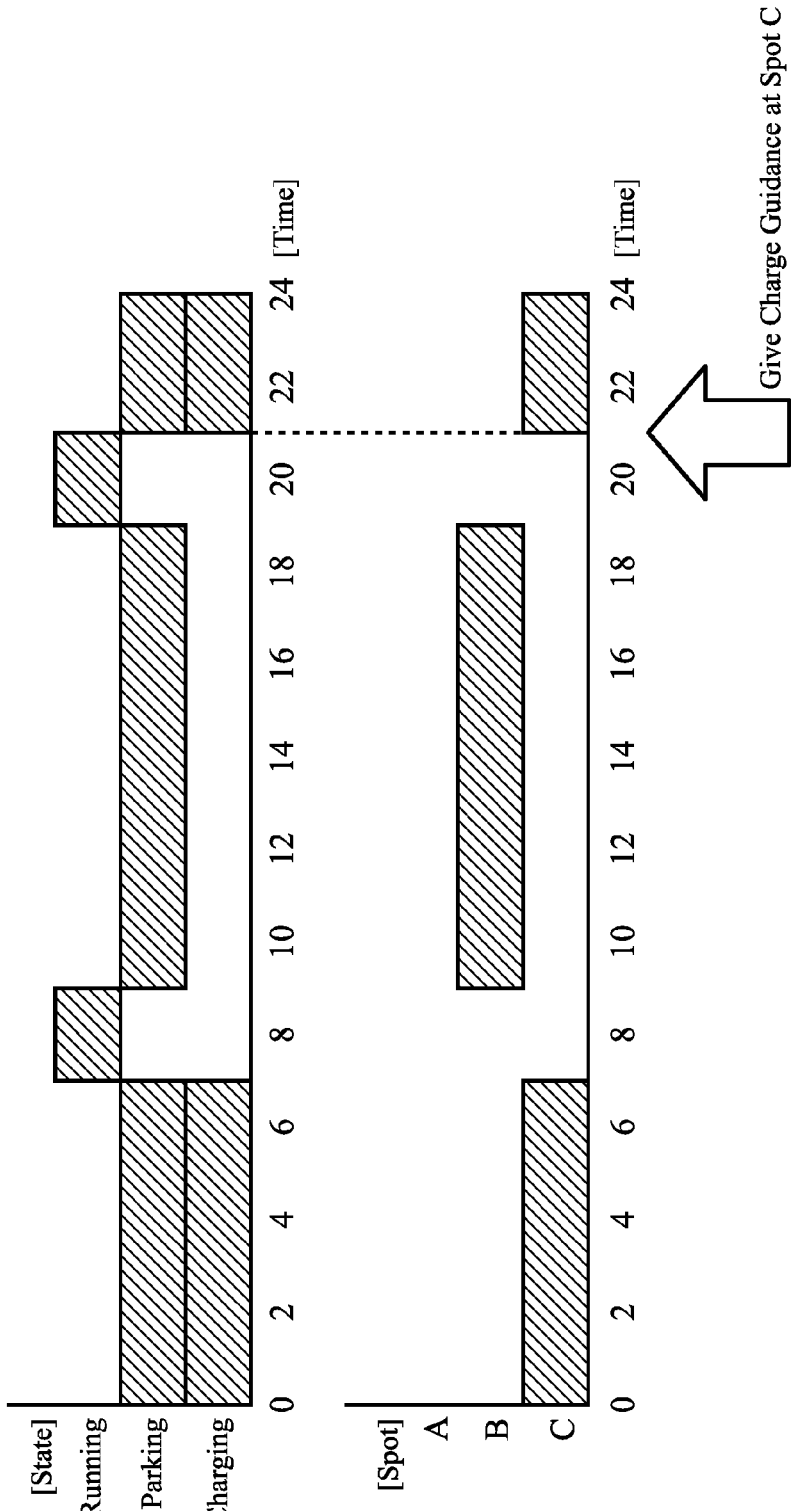
FIG. 7 is a diagram showing relationships between individual states of usual traveling, parking and charging and a visiting spot of an electric vehicle.

FIG. 7 is a diagram showing relationships between individual states of usual traveling, parking and charging and the visiting spots of an electric vehicle, which corresponds to FIG. 6(a). Incidentally, the upper half of FIG. 7 shows the states of the electric vehicle with respect to time, and the lower half shows parking spots (visiting spots) of the electric vehicle with respect to time. As shown in FIG. 7, the electric vehicle travels from 7 to 9 and from 19 to 21 o'clock, parks at spot B from 9 to 19 o'clock, and parks at spot C from 21 to 7 o'clock next day. In addition, during the parking at spot C, it charges the battery.

In this case, as for the usual charging spot, charging time and charging duration of the electric vehicle, the charging spot is spot C, the charge start time is 21 o'clock, and charging duration is 9 hours. It is desirable for the user (such as a driver) to be provided with the charge guidance prompting the battery charge at 21 o'clock which is the usual charge start time as indicated by the arrow in FIG. 7 or within a prescribed time period before that. Incidentally, as the prescribed time period, about 30 minutes are supposed.

Figure 8:
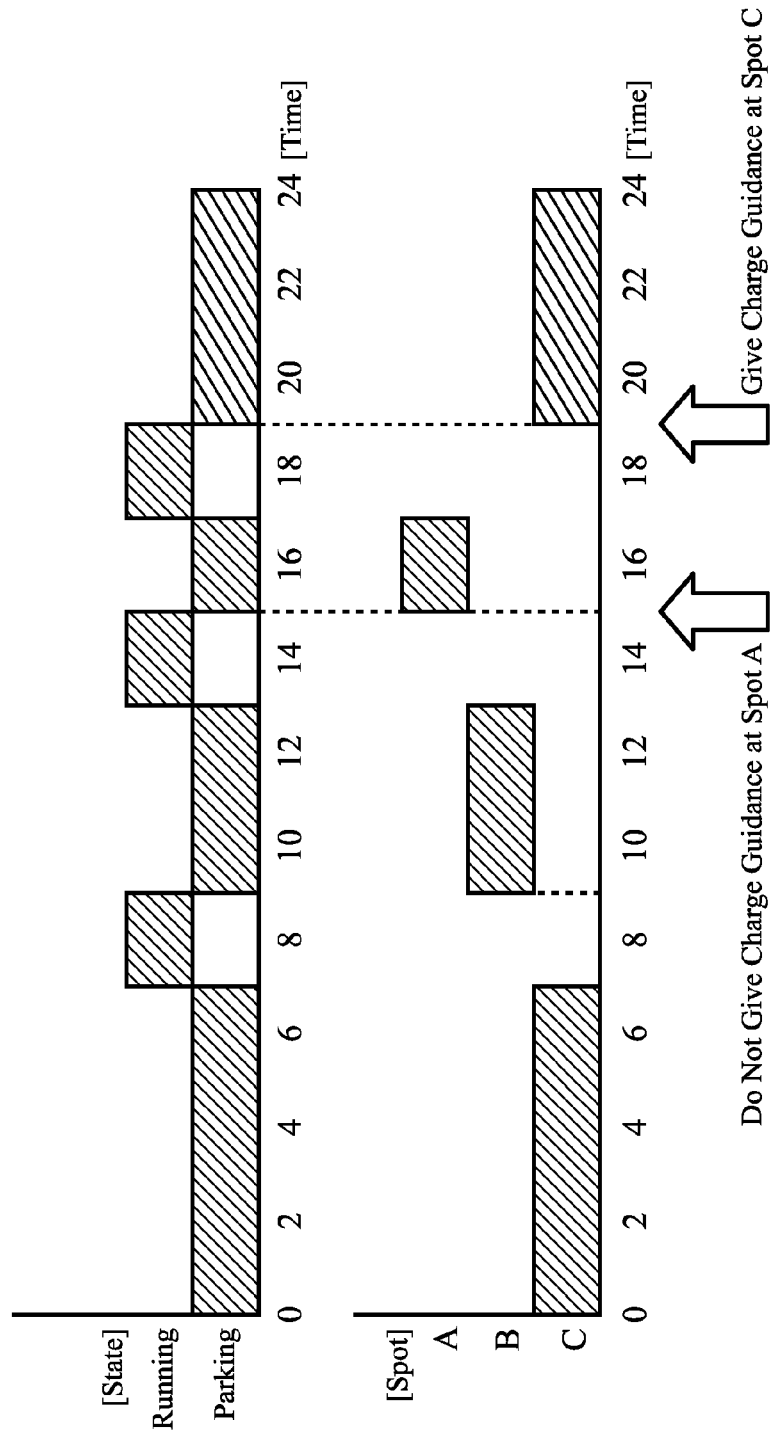
FIG. 8 is a diagram showing relationships between individual states of unusual traveling, parking and charging and a visiting spot of an electric vehicle.

FIG. 8 is a diagram showing relationships between individual states of the unusual traveling and parking and the visiting spots of the electric vehicle, which corresponds to FIG. 6(*b*). Incidentally, the upper half of FIG. 8 shows the states of the electric vehicle with respect to time, and the lower half shows parking spots (visiting spots) of the electric vehicle with respect to time. FIG. 8, which differs from FIG. 7, shows that the vehicle travels from spot B to spot A from 13 to 15 o'clock, parks from 15 to 17 o'clock, travels from spot A to spot C from 17 to 19 o'clock, and parks at spot C from 19 o'clock.

While the electric vehicle is traveling or parking at spot A, the navigation system 2 decides whether to execute the charge guidance of the battery for the driver or not. If the remaining battery life b is so short as to hinder the traveling just coming, it is necessary to charge the battery immediately. Accordingly, even if the electric vehicle is during traveling (from 13 to 15 or 17 to 19 o'clock), it provides the charge guidance. For example, it displays the charge guidance screen on the display unit 8, or gives the charge guidance by voice while the user is driving and cannot watch the screen.

On the other hand, when the remaining battery life b is enough and no immediate charging is necessary, and if the spot and the period of time at which the electric vehicle is parking differ from the usual charging spot and charging period of time learned by the learning processing unit 24, it does not execute the charge guidance of the battery. For example, if the usual charging spot is spot C and charge start time is 21 o'clock as shown in FIG. 7, the charge guidance is not given during parking from 9 to 13 o'clock at spot B and during parking from 15 to 17 o'clock at spot A shown in FIG. 8.

In contrast, as for the parking from 19 to 7 o'clock of the next day at spot C, since the parking spot agrees with spot C which is the usual charging spot and the parking period of time includes 21 o'clock which is the usual charge start time, it provides the driver with the charge guidance at 19 o'clock which is the parking start time or at 21 o'clock which is the usual charge start time.

Furthermore, if the battery charge is not yet started even though a prescribed time period has elapsed after providing the battery charge guidance to the driver or a prescribed time period has elapsed from the usual charge start time, it provides the driver with the battery charge guidance again, thereby preventing the user from forgetting charging.

Figure 9:
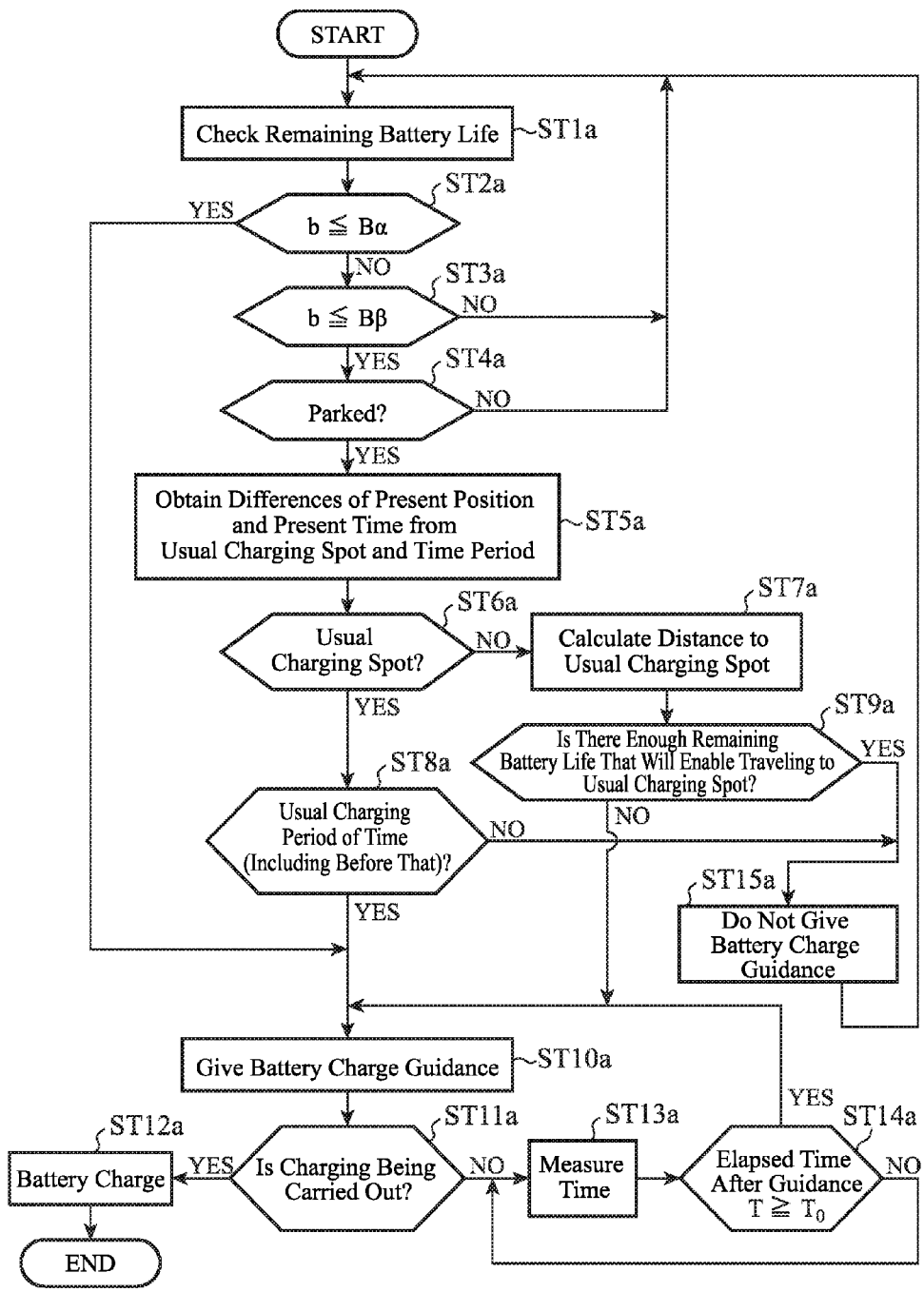
FIG. 9 is a flowchart showing a flow of the battery charge guidance processing of the charge guidance apparatus of the embodiment 1.

FIG. 9 is a flowchart showing a flow of the battery charge guidance processing by the charge guidance apparatus of the embodiment 1. Referring to the configuration of the apparatus shown in FIG. 2-FIG. 4, the processing will be described in detail along the line of FIG. 9.

First, to check the remaining battery life during the traveling of the electric vehicle, the decision processing unit 25 of the arithmetic unit 6 acquires the management information of the battery managing unit 13 regularly via the vehicle control unit 19, and extracts from the management information the information indicating the remaining battery life b (step ST1*a*).

Next, the decision processing unit 25 decides on whether the remaining battery life b becomes equal to or less than the threshold Bα (step ST2*a*). Incidentally, as described above, the threshold Bα is a value that will hinder the just coming travel of the vehicle and that indicates the remaining battery level at which the battery 14 must be charged immediately.

If the decision processing unit 25 decides that the remaining battery life b becomes equal to or less than the threshold Bα (YES at step ST2*a*), it notifies the charge guidance processing unit 26 of the decision result. Receiving the decision result, the charge guidance processing unit 26 carries out the battery charge guidance (step ST10*a*).

On the other hand, if it decides that the remaining battery life b is greater than the threshold Bα (NO at step ST2*a*), the decision processing unit 25 decides whether the remaining battery life b becomes equal to or less than the threshold Bβ (step ST3*a*). Incidentally, as described above, the threshold Bβ is a value that indicates the remaining battery level that will enable the vehicle to travel within the range not greater than the predetermined middle distance.

If the decision processing unit 25 decides that the remaining battery life b is greater than the threshold Bβ (NO at step ST3*a*), the processing returns to step ST1*a* to acquire the remaining battery life regularly, followed by the processing at step ST2*a* and step ST3*a*.

If it decides that the remaining battery life b becomes equal to or less than the threshold Bβ (YES at step ST3*a*), the decision processing unit 25 decides from the vehicle information acquired from the vehicle control unit 19 as to whether the vehicle is parking or not (step ST4*a*). Here unless the vehicle is parking (NO at step ST4*a*), since it is not necessary for the battery to be charged urgently as when the remaining battery life b is greater than the threshold Bβ, the processing returns to step ST1*a* to check the remaining battery life.

If the decision processing unit 25 decides that the vehicle is parking (YES at step ST4*a*), it calculates the difference of the present time at which the decision is made that the vehicle is parking and the difference of the present position of the vehicle from the learning result of the usual charging period of time and charging spot of the battery 14 readout of the storage unit 5 (step ST5*a*). For example, as for the position, it obtains the absolute values of the differences in the latitude and longitude, and as for the time, it obtains the difference between the present time and the usual charge start time.

After that, the decision processing unit 25 decides from the difference in the position calculated at step ST5*a* as to whether the present parking position of the vehicle agrees with the usual charging spot or not, that is, whether the present position is the usual charging spot or not (step ST6*a*). For example, if the difference is within a prescribed tolerable range, it decides that the present parking position of the vehicle agrees with the usual charging spot, and if it is out of the tolerable range, it decides that it does not agree.

Incidentally, the prescribed tolerable range can be the prescribed range which is used for deciding the usual charging spot, and places within which are assumed to be the same point.

Unless the present parking position of the vehicle agrees with the usual charging spot (NO at step ST6*a*), the decision processing unit 25 calculates from the difference value calculated at step ST5*a* the distance to be traveled from the present position (parking spot) of the vehicle to the usual charging spot (step ST7*a*).

Next, referring to the power consumption information indicating the amount of power of the battery 14 consumed per unit traveled distance of the vehicle, the decision processing unit 25 decides from the traveled distance calculated at step ST7*a* and from the present remaining battery life b as to whether the vehicle can reach the usual charging spot or not (step ST9*a*). Here, depending on whether the remaining battery life b is greater than the power consumption required for the traveling from the present position of the vehicle to the usual charging spot or not, the decision processing unit 25 decides whether to give the charge guidance or not.

If it decides that the power consumption required for the traveling from the present position of the vehicle to the usual charging spot is greater than the present remaining battery life b and that the vehicle cannot reach the usual charging spot (NO at step ST9a), the decision processing unit 25 decides that the battery must be charged urgently and notifies the charge guidance processing unit 26 of the decision result. Receiving the notification, the charge guidance processing unit 26 gives the battery charge guidance at step ST10a.

If the present parking position of the vehicle agrees with the usual charging spot (YES at step ST6a), the decision processing unit 25 decides whether the present time is in the usual charging period of time, or decides, unless the present time is in the usual charging period of time, whether the present time is before the start time of the usual charging period of time and within the prescribed time period (step ST8a). For example, if the shift of the period of time is within the prescribed tolerable time range, it decides that it is in the usual charging period of time. Incidentally, the prescribed tolerable time range can be the prescribed range which is used for deciding the usual charge start time, and any time within which is assumed to be the same time.

If the present time is within the usual charging period of time or the present time is before the start time of the usual charging period of time and within the prescribed time period (YES at step ST8a), the decision processing unit 25 decides that the charge guidance is executable, and notifies the charge guidance processing unit 26 of the decision result. Receiving the notification, the charge guidance processing unit 26 gives the battery charge guidance at step ST10a.

After providing the battery charge guidance at step ST10a, the charge guidance processing unit 26 acquires the management information of the battery managing unit 13 via the vehicle control unit 19, and decides whether the charge of the battery 14 is being carried out or not from the management information (step ST11a). Here, if it decides that the charge of the battery 14 is being carried out (YES at step ST11a), the battery charge is continued (step ST12a), and when the battery 14 is charged up to a prescribed capacity, the processing is terminated.

On the other hand, if it decides that the charge of the battery 14 is not being carried out (NO at step ST11a), the charge guidance processing unit 26 measures the elapsed time from executing the charge guidance to the start of the charge of the battery 14 from the time information supplied successively from the clock unit 4 and from the management information of the battery managing unit 13 (step ST13a), and decides whether the elapsed time T exceeds the prescribed value $T_0$ or not (step ST14a). If the elapsed time T is less than the prescribed value $T_0$ (NO at step ST14a), the charge guidance processing unit 26 returns to step ST13a to continue the time measurement. In contrast, if the elapsed time T exceeds the prescribed value $T_0$ (YES at step ST14a), the charge guidance processing unit 26 makes a decision that the driver forgets preparing the battery charge, and returns to step ST10a to carry out the battery charge guidance again.

On the other hand, unless the present time is in the usual charging period of time or unless the present time is before the start time of the usual charging period of time and within the prescribed time period (NO step ST8a), or if the power consumption by the traveling from the present position of the vehicle to the usual charging spot is not greater than the remaining battery life b and the remaining battery life b enables traveling to the usual charging spot (YES step ST9a), the decision processing unit 25 decides that there is not much urgency for the battery charge, and notifies the charge guidance processing unit 26 of the decision result. Receiving the decision result, the charge guidance processing unit 26 returns to the processing at step ST1a without giving the battery charge guidance (step ST15a), and repeats the foregoing processing.

As described above, according to the present embodiment 1, it comprises the history creation retaining unit 23 for creating the history information about the charging spot, the charge start time and the charging duration of the battery 14 of the vehicle 1; the learning processing unit 24 for extracting the charging spot at which the frequency of executing the charging is not less than the prescribed number of times, the charge start time and the charging duration of the battery 14 of the vehicle 1 from the history information created by the history creation retaining unit 23, and for learning the usual charging spot and charging period of time of the vehicle 1 from the charging spot, charge start time and charging duration extracted; the decision processing unit 25 for deciding whether to carry out the charge guidance or not depending on whether the vehicle 1 is in the usual charging spot and charging period of time learned by the learning processing unit 24; and the charge guidance processing unit 26 for giving the charge guidance in accordance with the decision result of the decision processing unit 25. With such an arrangement, it can give appropriate guidance on charging the battery 14 to the driver and passenger of the vehicle 1 such as an electric vehicle. Accordingly, it can provide a driving environment that will not hinder the vehicle 1 from traveling because of the charging shortage.

In addition, according to the present embodiment 1, it can further prevent forgetting the charge of the battery 14 because the charge guidance processing unit 26 gives the charge guidance again even if the charge of the battery 14 is not carried out after the prescribed time period has elapsed after giving the previous charge guidance.

Furthermore, according to the present embodiment 1, it can make an appropriate decision whether to execute the charge guidance or not based on whether the vehicle is in a parking state that enables charging because the decision processing unit 25 decides that the charge guidance is executable when the vehicle 1 is parked in the usual charging spot learned by the learning processing unit 24.

Furthermore, according to the present embodiment 1, the decision processing unit 25 decides that the charge guidance is executable when the vehicle is parked at a time before the usual charging period of time learned by the learning processing unit 24. Accordingly, it can make an appropriate decision whether to carry out the charge guidance or not from the fact that the vehicle is in a parking state that enables charging before the usual charging period of time comes.

Furthermore, according to the present embodiment 1, it comprises the remaining battery life acquiring unit 25b for acquiring the residual power (remaining battery life b) of the battery 14 from the vehicle 1, wherein when the remaining battery life b acquired by the remaining battery life acquiring unit 25b is not greater than the prescribed threshold Bα or Bβ, the decision processing unit 25 decides whether to execute the charge guidance or not depending on whether the remaining battery life b is greater than the power consumed by the traveling from the present position to the usual charging spot of the vehicle 1 or not. This makes it possible to give appropriate charge guidance in accordance with the remaining battery life b even if the vehicle 1 is not in the usual charging spot or charging period of time.

Incidentally, although the foregoing embodiment 1 shows the configuration in which the learning processing unit 24 learns the usual charging spot and charging period of time of the vehicle 1 from the history information, a configuration is also possible which causes a user to record the usual charging spot and charging period of time of the vehicle 1 into the storage unit 5 with the input unit 7. In this case, it can set the charging spot and charging period of time that will satisfy the liking of the user.

Embodiment 2

In the embodiment 2, a configuration will be described which notifies a driver who gets out of a car of the battery charge guidance by wireless communication.

Figure 10:
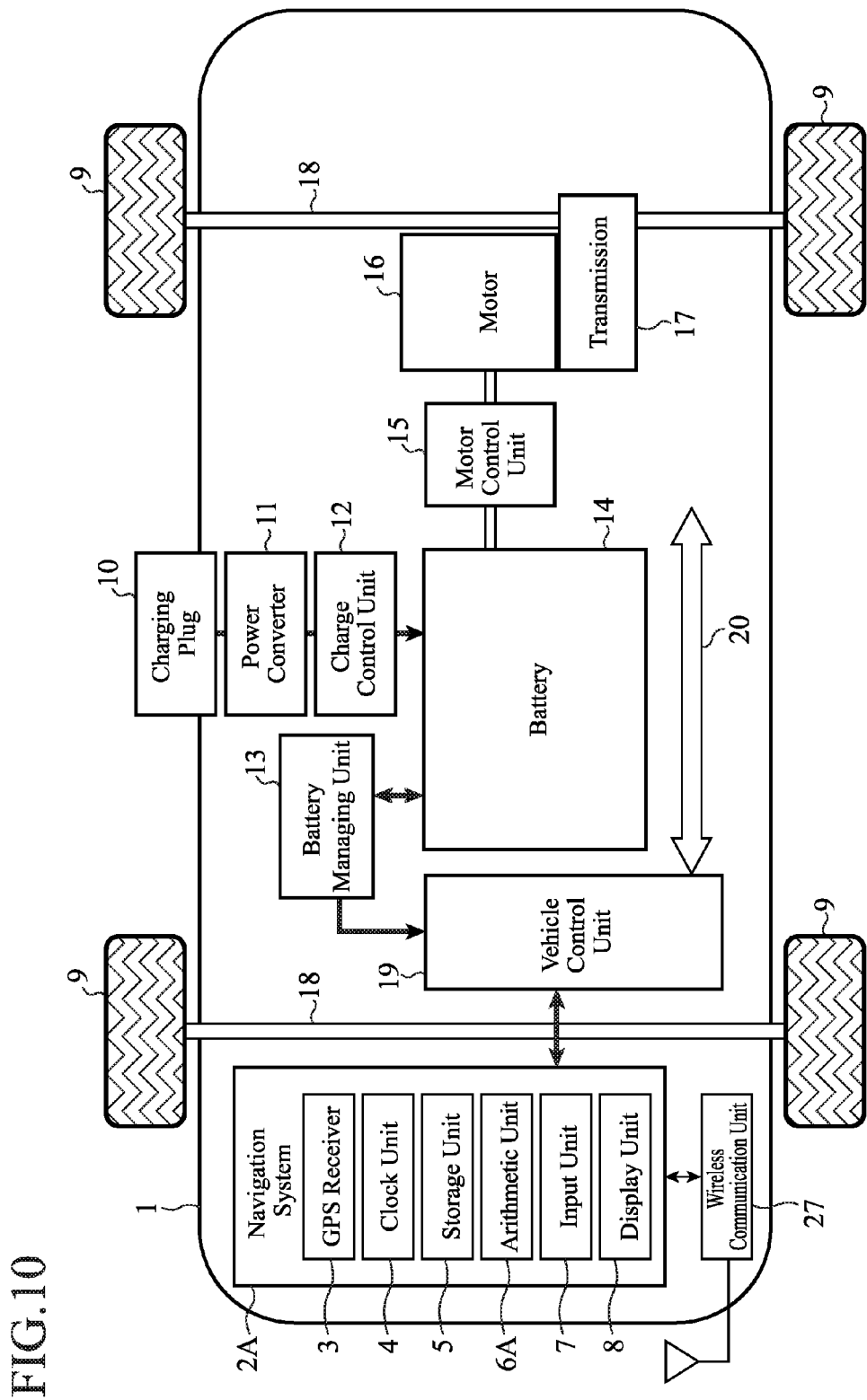
FIG. 10 is a block diagram showing a configuration of a navigation system to which a charge guidance apparatus of an embodiment 2 in accordance with the present invention is applied and an electric vehicle incorporating the navigation system.

FIG. 10 is a block diagram showing a configuration of a navigation system to which a charge guidance apparatus of the embodiment 2 in accordance with the present invention is applied and an electric vehicle incorporating the navigation system. Incidentally, in FIG. 10, the same components as those of FIG. 1 are designated by the same reference symbols, and their description will be omitted. The navigation system 2A of the embodiment 2 comprises a wireless communication unit 27 for carrying out wireless communication with an external device, in which an arithmetic unit 6A notifies a mobile communication terminal of a driver of the battery charge guidance by wireless communication using the wireless communication unit 27. Incidentally, as for a communication scheme of the wireless communication unit 27, although it is not designated, it can use a mobile phone, a wireless LAN (Local Area Network), ZigBee (registered trademark), Bluetooth (registered trademark), or narrow-band wireless communication (DSRC: Dedicated Short Range Communication), for example. In addition, communication equipment of 5.8 GHz band incorporating an ETC (registered trademark) device can also be used.

Figure 11:
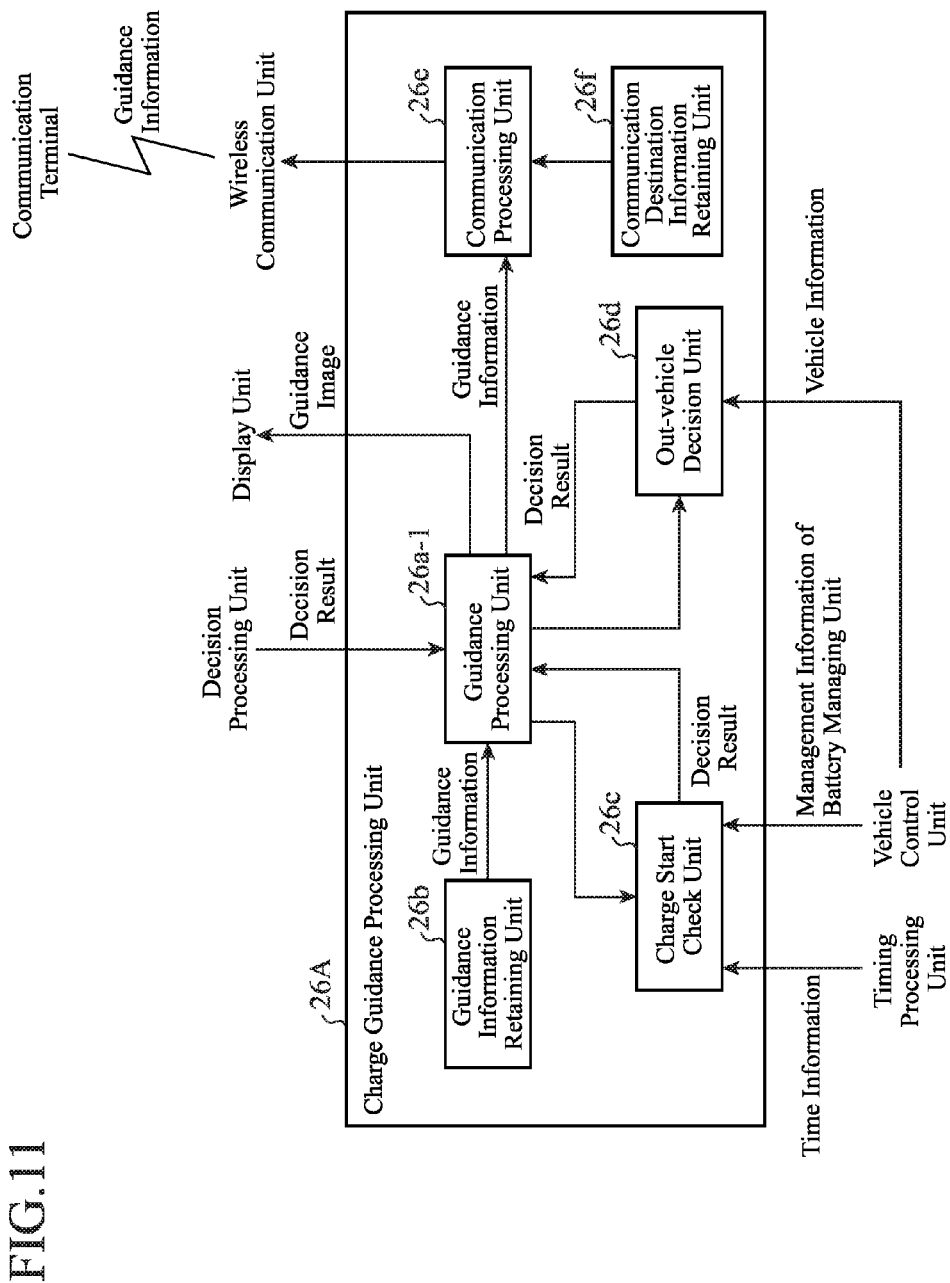
FIG. 11 is a block diagram showing a configuration of the charge guidance processing unit of the embodiment 2.

FIG. 11 is a block diagram showing a configuration of the charge guidance processing unit of the embodiment 2. In FIG. 11, the charge guidance processing unit 26A comprises a guidance processing unit 26a-1, the guidance information retaining unit 26b, the charge start check unit 26c, an out-vehicle decision unit 26d, a communication processing unit 26e and a communication destination information retaining unit 26f. The guidance processing unit 26a-1 is a component for carrying out the battery charge guidance in accordance with a decision result of the decision processing unit 25. In the embodiment 2, when the guidance processing unit 26a-1 receives the decision result informing that a driver is outside the vehicle when providing the battery charge guidance, it notifies the mobile communication terminal of the driver of the battery charge guidance via the wireless communication by the communication processing unit 26e and wireless communication unit 27. Incidentally, as for the communication terminal that receives the battery charge guidance, it can be a mobile phone terminal the driver carries, a PDA (Personal Digital Assistance) which is a portable information terminal, a PND (Portable Navigation Device) which a driver brings into a vehicle to use, or a portable personal computer.

In addition, as in the foregoing embodiment 1, the guidance processing unit 26a-1 can also create a guidance image from the guidance information read out of the guidance information retaining unit 26b, and display the guidance screen on the display unit 8. Furthermore, the guidance processing unit 26a-1 carries out the battery charge guidance again when it receives the decision result from the charge start check unit 26c that charging is not yet started even though the prescribed time has elapsed from the charge guidance.

The guidance information retaining unit 26b is a storage unit for retaining the guidance information indicating the contents of the charge guidance. The contents of the charge guidance include a guidance message for prompting charging and layout information on the guidance screen. Incidentally, it is also possible to retain as the guidance information a guidance image corresponding to the screen size of the mobile communication terminal of the driver and the layout information on the guidance screen.

The charge start check unit 26c is a component for deciding from the time information successively supplied by the timing processing unit 22 and from the management information of the battery managing unit 13 whether the battery charge is started or not before the prescribed time has elapsed from the time when the guidance processing unit 26a-1 carried out the battery charge guidance.

The out-vehicle decision unit 26d is a component for acquiring the vehicle information from the vehicle control unit 19 when the guidance processing unit 26a-1 notifies that it executes the battery charge guidance, and for deciding from the vehicle information whether the driver gets out of the vehicle or not. For example, the driver's seat is provided with a seated sensor for detecting whether a driver is sitting therein or not, and the detection information of the seated sensor is supplied to the out-vehicle decision unit 26d. Alternatively, when there is a key such as an ignition key of a gasoline-engine car, which is fit to a prescribed part in the vehicle during the use of the vehicle, it is also possible to acquire the detection information of a sensor for detecting whether the key is fit to the part or not as the vehicle information.

The communication processing unit 26e is a component for carrying out wireless communication with the external device via the wireless communication unit 27. For example, the communication processing unit 26e corresponds to an interface between the navigation system 2A and the wireless communication unit 27.

The communication destination information retaining unit 26f is a storage unit for retaining the communication destination information such as the communication address of the communication terminal to which the battery charge guidance is to be sent. For example, when sending the battery charge guidance via e-mail, it retains the e-mail address as the communication destination information. In addition, it can also retain as the communication destination information the address information for identifying a communication terminal on the communication network, and can provide the battery charge guidance using an information display application for displaying news contents in a telop on the screen of the communication terminal.

Incidentally, the guidance processing unit 26a-1, guidance information retaining unit 26b, charge start check unit 26c, out-vehicle decision unit 26d, communication processing unit 26e and communication destination information retaining unit 26f are implemented as concrete means which cause software and hardware to cooperate to execute program modules corresponding to the functions of the foregoing components in the charge guidance processing programs in accordance with the purpose of the present invention by the arithmetic unit 6A which is a computer for realizing the navigation system 2A, for example.

Next, the operation will be described.

Figure 12:
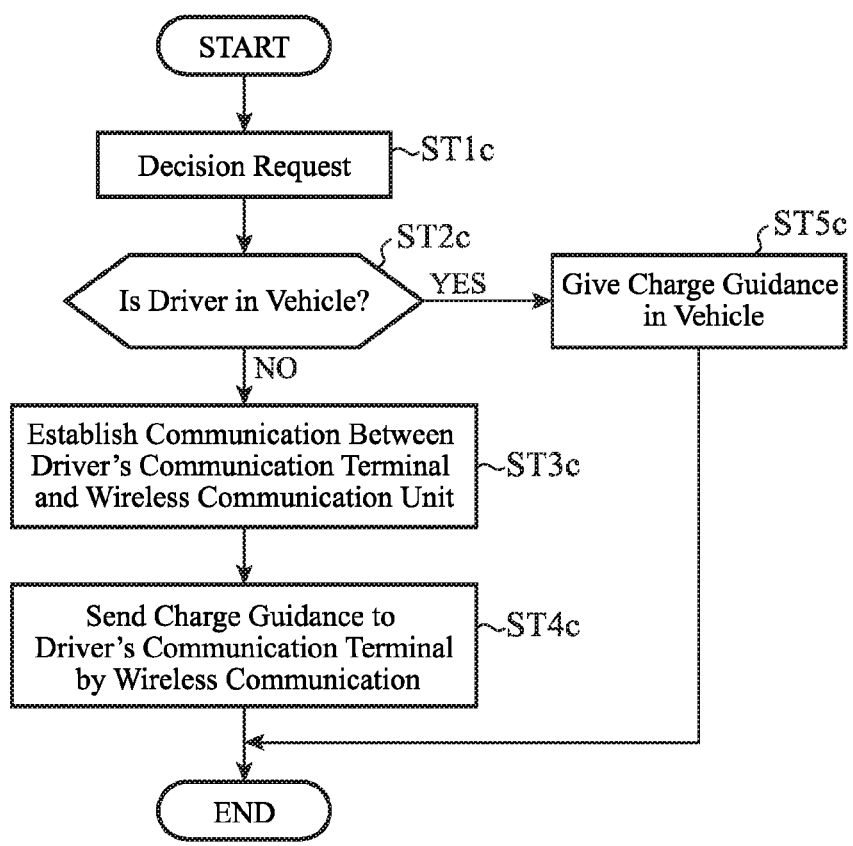
FIG. 12 is a flowchart showing a flow of the battery charge guidance processing of the charge guidance apparatus of the embodiment 2.

FIG. 12 is a flowchart showing a flow of the battery charge guidance processing of the charge guidance apparatus of the embodiment 2. The processing shown in FIG. 12 corresponds to the processing at step ST10a in the processing at the individual steps described with reference to FIG. 9 in the foregoing embodiment 1.

First, the guidance processing unit 26a-1 makes a decision request to the out-vehicle decision unit 26d for checking whether a driver is in a vehicle or not when executing the battery charge guidance in accordance with the decision result of the processing unit 25 (step ST1c).

Receiving the decision request from the guidance processing unit 26a-1, the out-vehicle decision unit 26d acquires the vehicle information from the vehicle control unit 19, and decides from the vehicle information as to whether the driver gets out of the vehicle or not, that is, whether the driver is in the vehicle or not (step ST2c). When it decides that the driver is in the vehicle (YES at step ST2c), the out-vehicle decision unit 26d notifies the guidance processing unit 26a-1 of the decision result. Receiving the decision result that the driver is in the vehicle, the guidance processing unit 26a-1 gives the charge guidance in the vehicle (step 5c).

On the other hand, when it does not decide that the driver is in the vehicle (NO at step ST2c), the out-vehicle decision unit 26d notifies the guidance processing unit 26a-1 of the decision result. Receiving the decision result that the driver is not in the vehicle, the guidance processing unit 26a-1 instructs the communication processing unit 26e to establish wireless communication with the communication terminal the driver carries. According to the instruction from the guidance processing unit 26a-1, the communication processing unit 26e establishes wireless communication between the communication terminal of the driver and the wireless communication unit 27 in accordance with the communication address of the communication terminal of the driver read out of the communication destination information retaining unit 26f (step ST3c).

When the communication processing unit 26e establishes the wireless communication between the communication terminal of the driver and the wireless communication unit 27, the guidance processing unit 26a-1 supplies the communication processing unit 26e with the battery charge guidance information it reads out of the guidance information retaining unit 26b, and transmits the guidance information to the communication terminal of the driver via the communication processing unit 26e and wireless communication unit 27 (step ST4c). Thus, the communication terminal carries out the battery charge guidance.

As described above, according to the present embodiment 2, it comprises the wireless communication unit 27 for communicating with the mobile communication terminal the driver or passenger of the vehicle 1 carries, and carries out the charge guidance by the communication between the communication terminal and the wireless communication unit 27 unless the charge guidance processing unit 26A detects that a person is in the vehicle 1. Accordingly, even if the driver is not in the vehicle, it provides the battery charge guidance again to the driver outside the vehicle, thereby being able to prevent the driver from forgetting charging the battery 14.

Embodiment 3

In the embodiment 3, a configuration will be described which notifies the outside of a vehicle of the battery charge guidance and the battery charging state by powerline communications.

Figure 13:
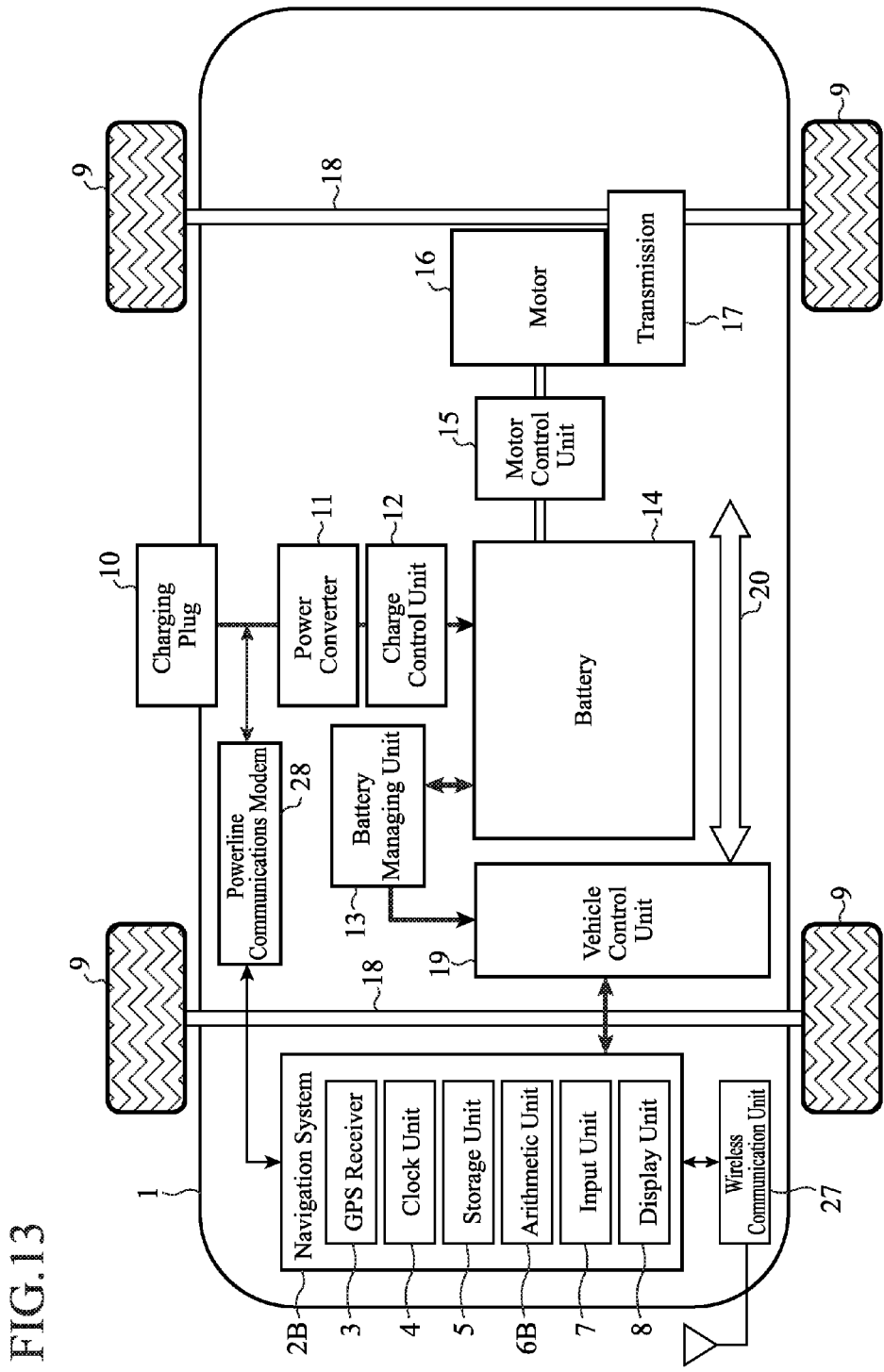
FIG. 13 is a block diagram showing a configuration of a navigation system to which a charge guidance apparatus of an embodiment 3 in accordance with the present invention is applied and an electric vehicle incorporating the navigation system.

FIG. 13 is a block diagram showing a configuration of a navigation system to which the charge guidance apparatus of the embodiment 3 in accordance with the present invention is applied, and an electric vehicle incorporating the system. Incidentally, in FIG. 13, the same components as those of FIG. 1 and FIG. 10 are designated by the same reference symbols, and their description will be omitted.

The navigation system 2B of the embodiment 3 comprises a powerline communications modem 28 for conducting powerline communications with an external device, in which an arithmetic unit 6B notifies the external device, which is connected to the powerline communications modem 28 via a powerline, of the battery charge guidance or of the charging state of the battery 14 by powerline communications via the powerline communications modem 28.

Figure 14:
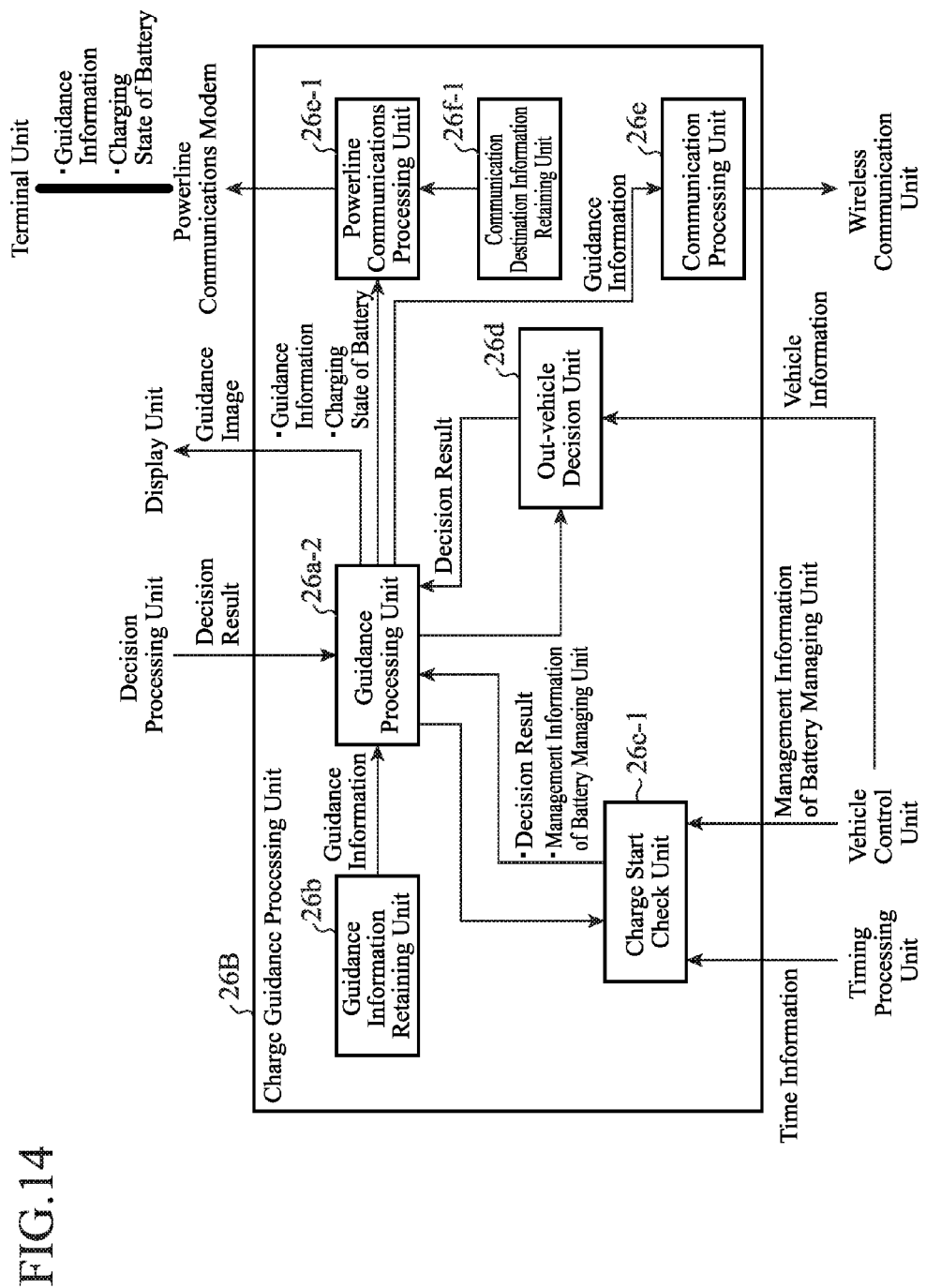
FIG. 14 is a block diagram showing a configuration of the charge guidance processing unit of the embodiment 3.

FIG. 14 is a block diagram showing a configuration of the charge guidance processing unit of the embodiment 3. Incidentally, in FIG. 14, the same components as those of FIG. 11 are designated by the same reference symbols, and their description will be omitted. The charge guidance processing unit 26B comprises a guidance processing unit 26a-2, the guidance information retaining unit 26b, a charge start check unit 26c-1, the out-vehicle decision unit 26d, the communication processing unit 26e, a powerline communications processing unit 26e-1 and a communication destination information retaining unit 26f-1. The guidance processing unit 26a-2 is a component for carrying out battery charge guidance in accordance with the decision result of the decision processing unit 25. In the embodiment 3, the guidance processing unit 26a-2 notifies an external terminal of the battery charge guidance or of the charging state of the battery 14 by the powerline communications via the powerline communications processing unit 26e-1 and powerline communications modem 28. Incidentally, although a television set or personal computer in the driver's home is usable as the external terminal for the powerline communications, this is not essential. For example, any device such as a mobile phone, PDA or PND is possible as long as it can present the information contents through connection to the powerline.

In addition, the guidance processing unit 26a-2 can create the guidance image from the guidance information read out of the guidance information retaining unit 26b and display is on the guidance screen of the display unit 8 in the same manner as the foregoing embodiment 1, or can notify the mobile communication terminal of the driver of the battery charge guidance by wireless communication via the communication processing unit 26e and wireless communication unit 27 as in the foregoing embodiment 2.

Furthermore, the guidance processing unit 26a-2 executes the battery charge guidance again when it receives the decision result from the charge start check unit 26c-1 that the charging is not yet started even though the prescribed time has elapsed after the charge guidance.

The charge start check unit 26c-1 is a component for deciding from the time information successively supplied from the timing processing unit 22 and the management information of the battery managing unit 13 as to whether the charge of the battery 14 has been started or not before the prescribed time has elapsed after the guidance processing unit 26a-2 provides the battery charge guidance. In addition, to notify of the charging state of the battery 14, the charge start check unit 26c-1 acquires the management information indicating the charging state of the battery 14 from the battery managing unit 13 and supplies it to the guidance processing unit 26a-2.

The powerline communications processing unit 26e-1 is a component for carrying out powerline communications with the external terminal via the powerline communications modem 28. For example, the powerline communications processing unit 26e-1 corresponds to the interface with the powerline communications modem 28 in the navigation system 2B.

The communication destination information retaining unit 26f-1 is a storage unit for retaining not only communication destination information such as a communication address of a communication terminal to which the battery charge guidance is sent by the wireless communication, but also communication destination information such as a communication address of a terminal to which the battery charge guidance and battery charging state are sent by the powerline communications.

Incidentally, the guidance processing unit 26a-2, guidance information retaining unit 26b, charge start check unit 26c-1, out-vehicle decision unit 26d, communication processing unit 26e, powerline communications processing unit 26e-1 and communication destination information retaining unit 26f-1 are implemented as concrete means which cause software and hardware to cooperate to execute program modules corresponding to the functions of the foregoing components in the charge guidance processing programs in accordance with the purpose of the present invention by the arithmetic unit 6B which is a computer for realizing the navigation system 2B, for example.

Next, the operation will be described.

For example, to charge the battery 14 from the commercial power line inside the driver's home, the charging plug 10 is connected to the commercial power line via a dedicated charging cable. Thus, the domestic terminal is connected to the powerline for transmitting the power of the commercial power line, and if it has the powerline communications function, it can carry out the powerline communications with the navigation system 2B by the powerline communications modem 28 via the powerline and dedicated charging cable.

The guidance processing unit 26a-2 provides the battery charge guidance in accordance with the decision result of the decision processing unit 25, and requests the charge start check unit 26c-1 to send the battery charging state if the charge of the battery 14 from the domestic commercial power line is started via the dedicated charging cable.

Receiving the request to send the battery charging state from the guidance processing unit 26a-2, the charge start check unit 26c-1 acquires the management information indicating the present charge quantity of the battery 14 from the battery managing unit 13 via the vehicle control unit 19, and supplies it to the guidance processing unit 26a-2.

In addition, the guidance processing unit 26a-2 instructs the powerline communications processing unit 26e-1 to establish powerline communications with the pre-registered domestic terminal. In conformity with the instruction from the guidance processing unit 26a-2, the powerline communications processing unit 26e-1 establishes powerline communications with the domestic terminal via the powerline communications modem 28 using the communication address of the terminal read out of the communication destination information retaining unit 26f-1.

When the powerline communications processing unit 26e-1 establishes the powerline communications with the domestic terminal, the guidance processing unit 26a-2 supplies the powerline communications processing unit 27e-1 with the management information indicating the charge quantity of the battery 14 acquired via the charge start check unit 26c-1. This causes the powerline communications processing unit 26e-1 and powerline communications modem 28 to transmit the management information to the domestic terminal. In the terminal, an application operates for displaying on the display screen the management information indicating the charge quantity of the battery 14 received via the powerline communications, for example, and displays the charge quantity of the battery 14 on the screen every time it receives the management information from the navigation system 2B.

As described above, according to the present embodiment 3, it comprises the powerline communications modem 28 for communicating with the external terminal, wherein the charge guidance processing unit 26B carries out the charge guidance via the communication between the powerline communications modem 28 and the external terminal when no person is detected in the vehicle 1, and notifies the terminal of the charging state of the battery 14 it acquires from the vehicle 1. With the configuration, it enables providing the battery charge guidance again or monitoring the charging state of the battery 14 via the powerline communications, thereby being able to prevent a user from forgetting the charge of the battery 14 or to charge up to a desired charge quantity appropriately.

Embodiment 4

In the embodiment 4, a configuration will be described which decides whether to charge the battery or not considering not only the power consumption by the traveling of a vehicle, but also the power consumption depending on vehicle conditions.

Figure 15:
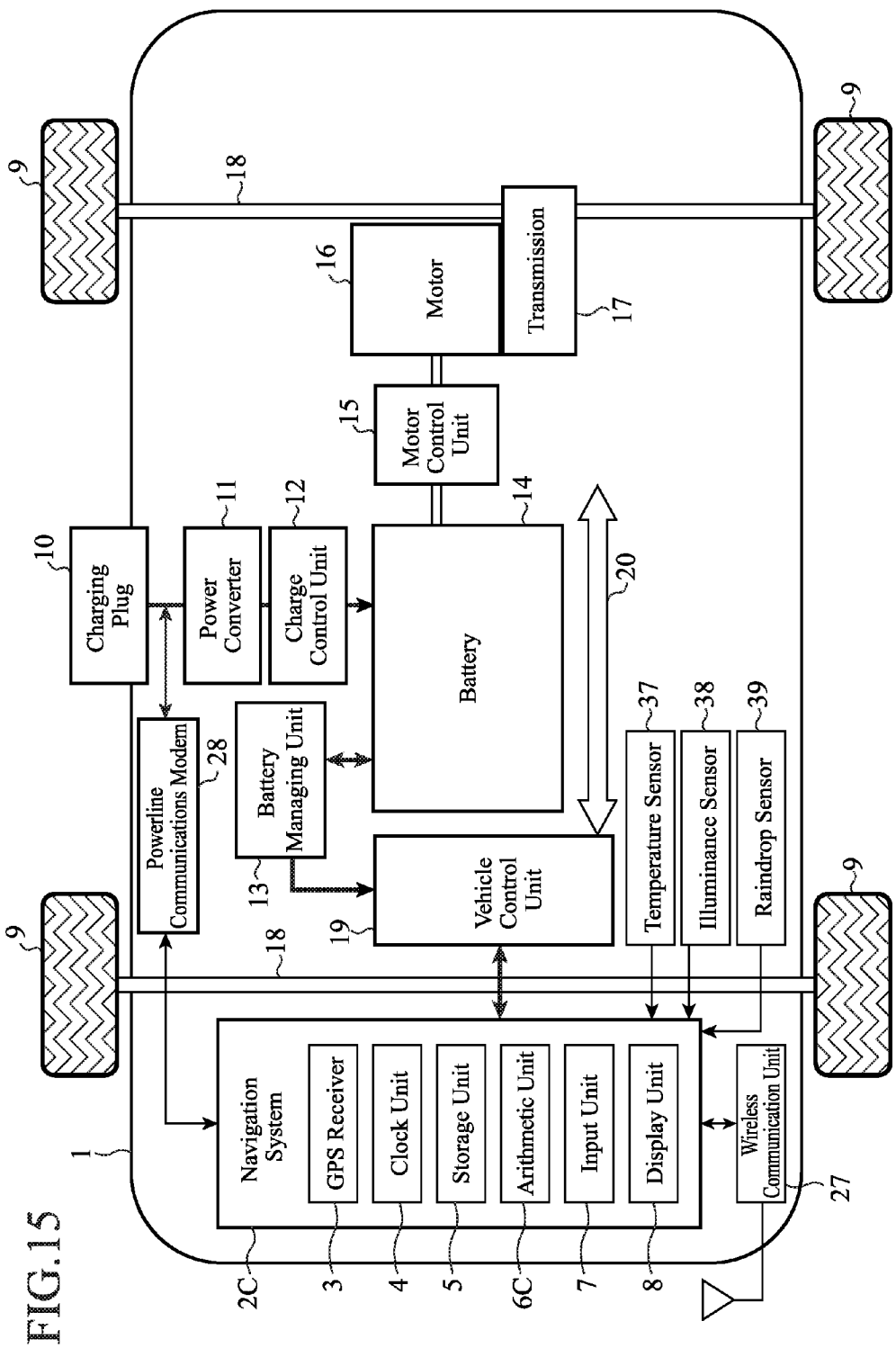
FIG. 15 is a block diagram showing a configuration of a navigation system to which a charge guidance apparatus of an embodiment 4 in accordance with the present invention is applied and an electric vehicle incorporating the navigation system.

FIG. 15 is a block diagram showing a configuration of a navigation system to which the charge guidance apparatus of the embodiment 4 in accordance with the present invention is applied and an electric vehicle incorporating the navigation system. Incidentally, in FIG. 15, the same components as those of FIG. 1 and FIG. 13 are designated by the same reference symbols, and their description will be omitted.

The navigation system 2C of the embodiment 4 comprises sensors 37-39 for detecting physical quantities for deciding vehicle conditions, and the arithmetic unit 6C decides whether to charge the battery 14 or not from not only the power consumption due to traveling of the vehicle, but also the power consumption which depends on the vehicle conditions and is estimated from the detection information of the sensors 37-39. Here, the temperature sensor 37 is a sensor for detecting the temperature inside and outside the vehicle, the illuminance sensor 38 is a sensor for detecting illuminance inside and outside the vehicle, and the raindrop sensor 39 is a sensor for detecting the raindrop quantity.

Figure 16:
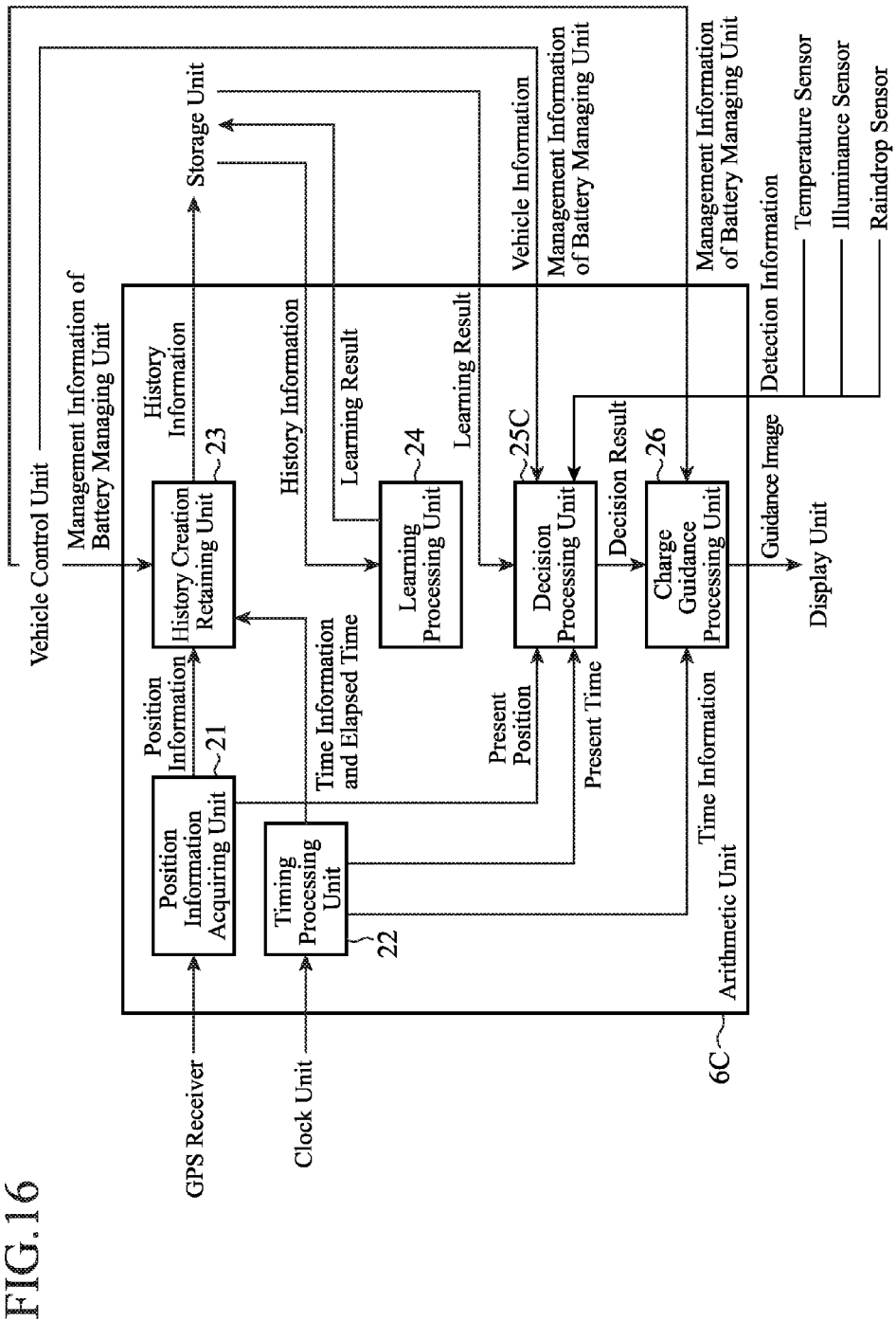
FIG. 16 is a block diagram showing a configuration of the arithmetic unit of the embodiment 4.

FIG. 16 is a block diagram showing a configuration of the arithmetic unit of the embodiment 4. Incidentally, in FIG. 16, the same components as those of FIG. 2 are designated by the same reference symbols, and their description will be omitted. Instead of the decision processing unit 25 in the configuration described with reference to FIG. 2 in the foregoing embodiment 1, the arithmetic unit 6C comprises a decision processing unit 25C for deciding whether to carry out the battery charge or not by receiving the detection information from the individual sensors 37-39. Thus, the decision processing unit 25C decides whether to provide the charge guidance about the battery 14 or not from the present position of the vehicle, the present time, the learning result about charging of the vehicle, the vehicle information, the management information of the battery managing unit 13, and the detection information of the sensors 37-39.

Incidentally, the position information acquiring unit 21, timing processing unit 22, history creation retaining unit 23, learning processing unit 24, decision processing unit 25C and charge guidance processing unit 26 are implemented as concrete means which cause software and hardware to cooperate to execute the charge guidance processing programs in accordance with the purpose of the present invention by the arithmetic unit 6C which is a computer for realizing the navigation system 2C, for example.

Figure 17:
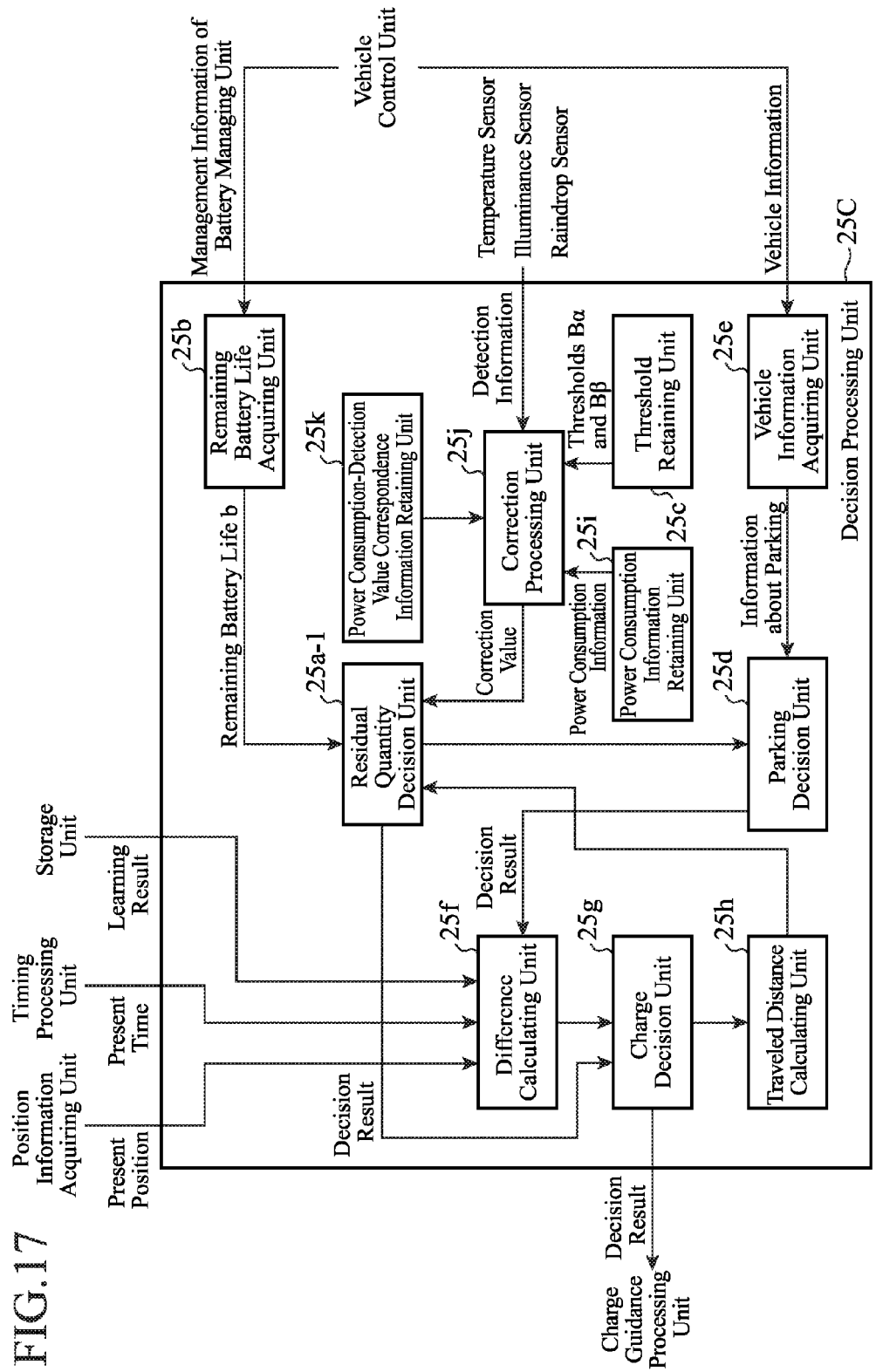
FIG. 17 is a block diagram showing a configuration of the decision processing unit of the embodiment 4.

FIG. 17 is a block diagram showing a configuration of the decision processing unit in FIG. 16. Incidentally, in FIG. 17, the same components as those of FIG. 3 are designated by the same reference symbols, and their description will be omitted.

The decision processing unit 25C comprises a residual quantity decision unit 25a-1, the remaining battery life acquiring unit 25b, the threshold retaining unit 25c, the parking decision unit 25d, the vehicle information acquiring unit 25e, the difference calculating unit 25f, the charge decision unit 25g, the traveled distance calculating unit 25h, the power consumption information retaining unit 25i, a correction processing unit 25*j* and a power consumption-detection value correspondence information retaining unit 25*k*.

The residual quantity decision unit 25*a*-1 is a component for comparing the remaining battery life b which is the present residual power of the battery 14 with correction values of the thresholds Bα and Bβ which incorporate a correction amount by the correction processing unit 25*j*, and for notifying the parking decision unit 25*d* of the compared result. In addition, the residual quantity decision unit 25*a*-1 decides on whether the vehicle can reach the usual charging spot of the battery 14 or not from the power consumption information into which the correction amount by the correction processing unit 25*j* is incorporated, from the traveled distance of the vehicle calculated by the traveled distance calculating unit 25*h* and from the present remaining battery life b, and supplies the decision result to the charge decision unit 25*g*.

The correction processing unit 25*j* is a component for determining the correction amount, which expresses the power consumption depending on the vehicle conditions in the unit of the charge quantity of the battery 14, from the detection information supplied from the sensors 37-39 by referring to the power consumption-detection value correspondence information, for calculating the correction values by incorporating the correction amount into the thresholds Bα and Bβ, and for calculating a correction value by incorporating the correction amount into the power consumption in the power consumption information.

The power consumption-detection value correspondence information retaining unit 25*k* is a storage unit for retaining the power consumption-detection value correspondence information. The term "power consumption-detection value correspondence information" refers to information that defines correspondence between the detection information indicating the vehicle conditions, which is detected with the sensors 37-39, and the power consumption of the onboard equipment identified by the detection information.

For example, onboard equipment used for each prescribed temperature range is determined in advance, and as to the thresholds Bα and Bβ which are set considering only the power consumption by traveling of the vehicle, an increase in the thresholds due to the power consumption of the onboard equipment used for each temperature range is obtained by experiment or the like in advance.

In other words, as for the power consumption-detection value correspondence information in accordance with the present invention, it is enough that it is information indicating correspondence between the conditions of the vehicle 1 and the power expected to be consumed by an operation other than the vehicle traveling under the conditions of the vehicle 1.

The correction processing unit 25*j*, when using an air conditioner if the temperature outside the vehicle is in a prescribed range, incorporates into the thresholds Bα and Bβ an increase in the threshold corresponding to the power consumption of the air conditioner for controlling the temperature in the vehicle to the temperature setting. In addition, when turning on the vehicle lamps if the brightness outside the vehicle is in a prescribed illuminance range, it incorporates into the thresholds Bα and Bβ an increase in the threshold corresponding to the power consumption of the vehicle lamps. When using the wipers in accordance with the raindrop quantity (intensity of rain), it incorporates an increase in the threshold corresponding to the power consumption of the wipers into the thresholds Bα and Bβ.

Likewise, when using the air conditioner if the temperature outside the vehicle is in the prescribed range, the correction processing unit 25*j* incorporates the power consumption of the air conditioner, which controls the temperature in the vehicle to the temperature setting, into the power consumption in the power consumption information retained in the power consumption information retaining unit 25*i*. In addition, when turning on the vehicle lamps if the brightness outside the vehicle is in a prescribed illuminance range, it incorporates the power consumption of the vehicle lamps into the power consumption in the power consumption information. When using the wipers in accordance with the raindrop quantity (intensity of rain), it incorporates the power consumption of the wipers into the power consumption in the power consumption information.

In addition, the residual quantity decision unit 25*a*-1, remaining battery life acquiring unit 25*b*, threshold retaining unit 25*c*, parking decision unit 25*d*, vehicle information acquiring unit 25*e*, difference calculating unit 25*f*, charge decision unit 25*g*, traveled distance calculating unit 25*h*, power consumption information retaining unit 25*i*, correction processing unit 25*j* and power consumption-detection value correspondence information retaining unit 25*k* are implemented as concrete means which cause software and hardware to cooperate to execute program modules corresponding to the functions of the foregoing components in the charge guidance processing programs in accordance with the purpose of the present invention by the arithmetic unit 6C which is a computer for realizing the navigation system 2C, for example.

Next, the operation will be described.

In the decision processing unit 25C, to confirm the remaining battery life during the traveling of the electric vehicle, the remaining battery life acquiring unit 25*b* regularly acquires the management information from the battery managing unit 13 via the vehicle control unit 19, and extracts information indicating the remaining battery life b from the management information.

At this point, the correction processing unit 25*j* acquires the detection information from the temperature sensor 37, illuminance sensor 38 and raindrop sensor 39, decides the correction amount (increase in the thresholds) due to the power consumption depending on the present vehicle conditions by referring to the power consumption-detection value correspondence information read out of the power consumption-detection value correspondence information retaining unit 25*k* in accordance with the detection information, and calculates the correction values by incorporating the correction amount into the thresholds Bα and Bβ.

The residual quantity decision unit 25*a*-1 compares the correction value of the threshold Bα obtained by the correction processing unit 25*j* with the remaining battery life b received from the remaining battery life acquiring unit 25*b*, and decides whether the remaining battery life b becomes equal to or less than the correction value of the threshold Bα or not. Here, when the remaining battery life b is equal to or less than the correction value of the threshold when it Bα, the residual quantity decision unit 25*a*-1 supplies the decision result to the charge decision unit 25*g*. In this case, since the remaining battery life b reduces to such a level as to hinder the vehicle from traveling just coming, the charge decision unit 25*g* notifies the charge guidance processing unit 26 of the decision result prompting the battery charge. Receiving the decision result, the charge guidance processing unit 26 provides the battery charge guidance.

On the other hand, when the residual quantity decision unit 25*a*-1 decides that the remaining battery life b is greater than the correction value of the threshold Bα, it decides whether the remaining battery life b becomes equal to or less than the correction value of the threshold Bβ. At this point, if the remaining battery life b is greater than the correction value of the threshold Bβ, the foregoing processing is executed again by regularly acquiring the remaining battery life b.

In contrast, when the residual quantity decision unit 25a-1 decides that the remaining battery life b is equal to or less than the correction value of the threshold Bβ, it requests the parking decision unit 25d to make a parking decision. Receiving the decision request from the residual quantity decision unit 25a-1, the parking decision unit 25d decides whether the vehicle is parking or not from the vehicle information acquired from the vehicle control unit 19 by the vehicle information acquiring unit 25e.

Here, if the vehicle is not parking, since the battery charge is not urgent as in the case where the remaining battery life b is greater than threshold Bβ, the processing returns to the remaining battery life confirmation processing.

When the parking decision unit 25d decides that the vehicle is parking, it supplies the decision result to the difference calculating unit 25f. The difference calculating unit 25f calculates the difference of the present time, at which a decision is made that the vehicle is parking, and the difference of the present position of the vehicle from the learning results about the usual charging period of time and the usual charging spot of the battery 14, which are read out of the storage unit 5, and supplies the differences to the charge decision unit 25g.

After that, the charge decision unit 25g decides from the difference in the vehicle position whether the present parking position of the vehicle agrees with the usual charging spot or not, that is, whether the present position is the usual charging spot or not. For example, if the difference is within the prescribed tolerable range, it decides that the present parking position of the vehicle agrees with the usual charging spot. In contrast, if the difference is outside the tolerable range, it decides that they disagree.

Unless the present position of the vehicle agrees with the usual charging spot, the charge decision unit 25g supplies the traveled distance calculating unit 25h with the difference value calculated by the difference calculating unit 25f and a calculation request of the traveled distance. Receiving the calculation request, the traveled distance calculating unit 25h calculates the traveled distance from the present position of the vehicle (parking spot) to the usual charging spot from the difference calculated by the difference calculating unit 25f.

At this point, the correction processing unit 25j decides the correction amount due to the power consumption depending on the present vehicle conditions by referring to the power consumption-detection value correspondence information read out of the power consumption-detection value correspondence information retaining unit 25k in accordance with the detection information acquired from the temperature sensor 37, illuminance sensor 38 and raindrop sensor 39, and calculates the correction value by incorporating the correction amount into the power consumption in the power consumption information read out of the power consumption information retaining unit 25i.

Next, the residual quantity decision unit 25a-1 decides whether the vehicle can arrive at the usual charging spot or not from the traveled distance calculated by the traveled distance calculating unit 25h and from the present remaining battery life b by referring to the power consumption information corrected by the correction processing unit 25j. Here, if it decides that the vehicle cannot reach the usual charging spot with the present remaining battery life b, the residual quantity decision unit 25a-1 supplies the decision result to the charge decision unit 25g.

As for the remaining battery life that will hinder the vehicle from reaching the usual charging spot, the charge decision unit 25g makes a decision of prompting the battery charge because of the urgency of the battery charge, and notifies the charge guidance processing unit 26 of the decision result. Thus, the charge guidance processing unit 26 carries out the battery charge guidance.

The remaining processing is the same as the processing at step ST8a and step ST10a-step ST15a in the flow described in the foregoing embodiment 1 with reference to FIG. 9.

As described above, according to the present embodiment 4, it comprises the sensors 37-39 for detecting the conditions of the vehicle 1, wherein the decision processing unit 25C retains the power consumption-detection value correspondence information indicating the correspondence between the conditions of the vehicle 1 and the power expected to be consumed by operations other than the traveling of the vehicle in the conditions of the vehicle 1, and corrects the prescribed thresholds Bα and Bβ and the power consumption due to traveling of the vehicle 1 from the present position to the usual charging spot by referring to the power consumption-detection value correspondence information based on the conditions of the vehicle 1 detected with the sensors 37-39 when making a decision whether to carry out the charge guidance or not. Thus, it decides whether to charge the battery 14 or not considering not only the power consumption depending on traveling of the vehicle 1, but also the power consumption depending on the vehicle conditions determined from the detection information of the sensors 37-39. Accordingly, it can improve the accuracy of the decision whether to charge the battery or not.

Embodiment 5

Although the embodiment 5 decides whether to charge the battery or not considering the power consumption depending on the vehicle conditions as the foregoing embodiment 4, it decides the vehicle conditions of the vehicle from the information acquired from an external device by wire or wireless communication.

Figure 18:
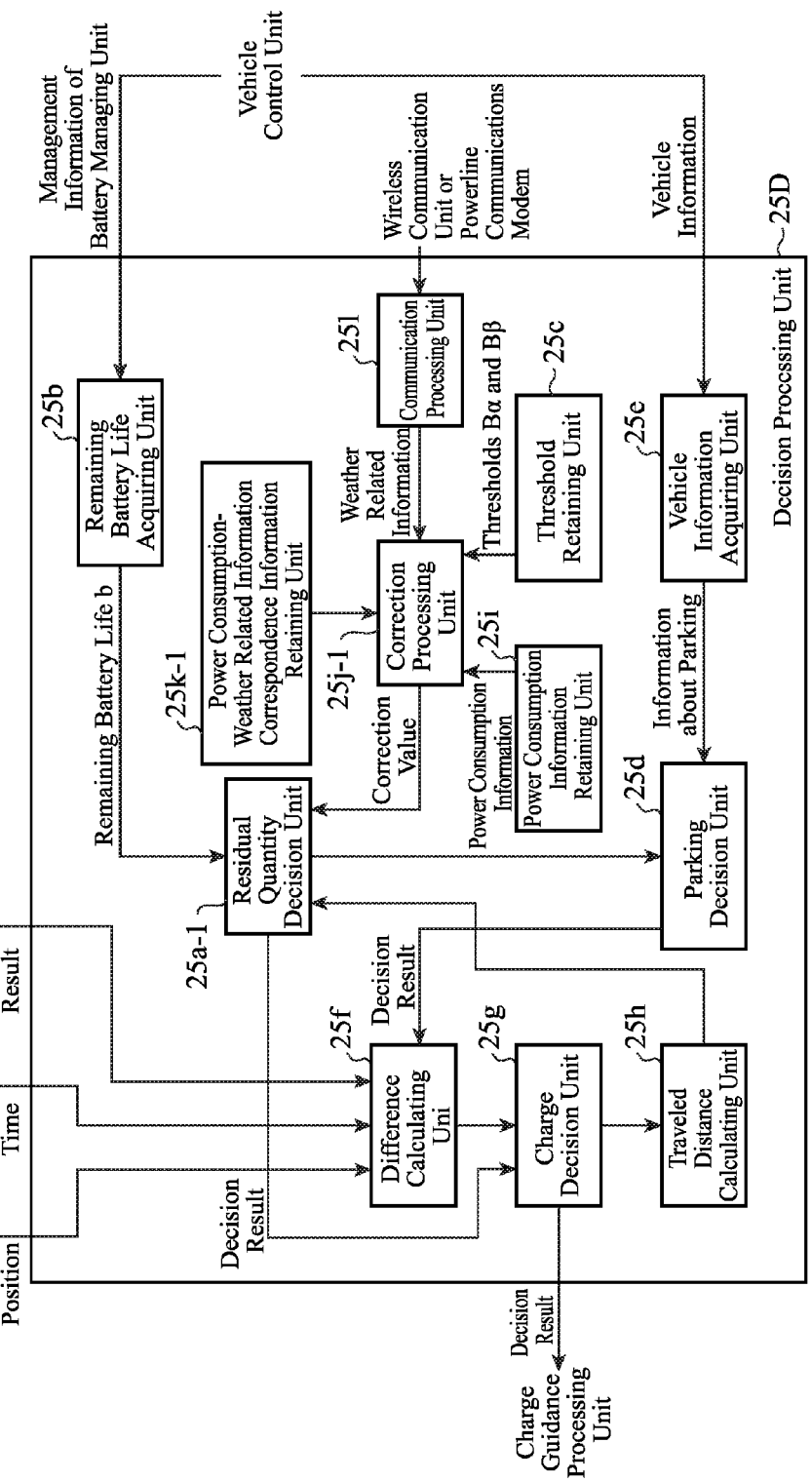
FIG. 18 is a block diagram showing a configuration of the decision processing unit of a charge guidance apparatus of an embodiment 5 in accordance with the present invention.

FIG. 18 is a block diagram showing a configuration of the decision processing unit of a charge guidance apparatus of the embodiment 5 in accordance with the present invention. Incidentally, in FIG. 18, the same components as those of FIG. 3 and FIG. 17 are designated by the same reference symbols and their description will be omitted.

The decision processing unit 25D comprises the residual quantity decision unit 25a-1, the remaining battery life acquiring unit 25b, the threshold retaining unit 25c, the parking decision unit 25d, the vehicle information acquiring unit 25e, the difference calculating unit 25f, the charge decision unit 25g, the traveled distance calculating unit 25h, the power consumption information retaining unit 25i, a correction processing unit 25j-1, a power consumption-weather related information correspondence information retaining unit 25k-1 and a communication processing unit 25l.

The correction processing unit 25j-1 is a component for determining the correction amount, which expresses the power consumption depending on the vehicle conditions in the unit of the charge quantity of the battery 14, from the weather related information acquired via the communication processing unit 25l by referring to the power consumption-weather related information correspondence information, for calculating the correction values by incorporating the correction amount into the thresholds Bα and Bβ, and for calculating a correction value by incorporating the correction amount into the power consumption in the power consumption information.

The power consumption-weather related information correspondence information retaining unit 25k-1 is a storage unit for retaining the power consumption-weather related information correspondence information. The term "power consumption-weather related information correspondence information" refers to information that defines correspondence between the weather related information acquired via the communication processing unit 25l and the power consumption of the onboard equipment identified by the weather related information. In addition, the term "weather related information" refers to weather information and weather forecast information at the present position of the vehicle and in its surroundings, such as information indicating weather, temperature, precipitation and the like.

In the embodiment 5, as in the foregoing embodiment 4, onboard equipment used for each prescribed temperature range is determined in advance, and as to the thresholds Bα and Bβ which are set considering only the power consumption by traveling of the vehicle, an increase in the thresholds due to the power consumption of the onboard equipment used for each temperature range is obtained by experiment or the like in advance.

In other words, as for the power consumption-weather related information correspondence information in accordance with the present invention, it is enough that it is information indicating correspondence between the conditions of the vehicle 1 and the amount of power expected to be consumed by an operation other than the vehicle traveling in the conditions of the vehicle 1.

The correction processing unit 25j-1 extracts the temperature information at the present position of the vehicle and in its surroundings from the weather related information acquired via the communication processing unit 25l, and decides the foregoing temperature range using the temperature information. For example, when using an air conditioner in the prescribed range of the temperature outside the vehicle, it incorporates into the thresholds Bα and Bβ the increase in the threshold corresponding to the power consumption of the air conditioner that controls the temperature in the vehicle to the temperature setting.

In addition, when turning on the vehicle lamps if it is cloudy or rainy and in a period of time in the early morning or from evening to night, the correction processing unit 25j-1 extracts the weather information at the present position of the vehicle and in its surroundings and the time information from the weather related information acquired via the communication processing unit 25l, and decides from the weather information and time information extracted as to whether it is cloudy or rainy and in a period of time in the early morning or from evening to night or not. In this case also, if the vehicle lamps are switched on, it incorporates the increase in the threshold corresponding to the power consumption of the vehicle lamps into the thresholds Bα and Bβ.

When using the wipers in accordance with the raindrop quantity (intensity of rain), the correction processing unit 25j-1 decides the intensity of rain using the weather information and precipitation information at present position of the vehicle and in its surroundings, which are extracted from the weather related information acquired via the communication processing unit 25l, and incorporates the increase in the threshold corresponding to the power consumption of the wipers into the thresholds Bα and Bβ.

Likewise, when using the air conditioner if the temperature outside the vehicle is in the prescribed range, the correction processing unit 25j-1 incorporates the power consumption of the air conditioner, which controls the temperature in the vehicle to the temperature setting, into the power consumption in the power consumption information retained in the power consumption information retaining unit 25i. In addition, when turning on the vehicle lamps if it is cloudy or rainy and in a period of time in the early morning or from evening to night, the correction processing unit 25j-1 incorporates the power consumption of the vehicle lamps into the power consumption in the power consumption information. When using the wipers in accordance with the raindrop quantity (intensity of rain), it incorporates the power consumption of the wipers into the power consumption in the power consumption information.

The communication processing unit 25l is a component for carrying out communication with an external device on a communication network such as the Internet by using the wireless communication unit 27 or powerline communications modem 28. For example, the communication processing unit 25l corresponds to an interface with the wireless communication unit 27 or powerline communications modem 28. Incidentally, the communication processing unit 25l establishes communication using the communication address of the external device on a preset communication network via the wireless communication unit 27 or powerline communications modem 28 in accordance with a request for acquiring the weather related information from the correction processing unit 25j-1, and acquires the weather related information.

Incidentally, as for the decision processing whether to charge the battery or not, the processing other than deciding the vehicle conditions from the weather related information as described above, it is the same as that in the foregoing embodiment 4.

As described above, according to the present embodiment 5, it comprises the wireless communication unit 27 or powerline communications modem 28 for carrying out communication with the external device, wherein the decision processing unit 25D retains the power consumption-weather related information correspondence information indicating the correspondence between the conditions of the vehicle 1 and the amount of power expected to be consumed for operations other than the traveling of the vehicle in the conditions of the vehicle 1, and corrects, when deciding whether to carry out the charge guidance or not, the power consumed by traveling to the usual charging spot from the prescribed thresholds Bα and Bβ and the present position of the vehicle 1 by referring to the power consumption-weather related information correspondence information based on the conditions of the vehicle 1 acquired from the external device by the communication with the wireless communication unit 27 or powerline communications modem 28. Thus, it decides whether to charge the battery 14 or not considering not only the power consumption due to traveling of the vehicle 1, but also the power consumption due to the vehicle conditions decided from the weather related information. Accordingly, it can improve the decision accuracy for deciding whether to charge of the battery or not.

In addition, although the foregoing embodiments 1-5 show examples which apply a charge guidance apparatus in accordance with the present invention to the onboard navigation system, they are also applicable to onboard equipment installed in the vehicle separately from the navigation system. For example, they are applicable to onboard equipment that provides a passenger with information on a display unit of RSE (Rear Seat Entertainment), to an onboard television set, or to a portable information terminal such as a mobile phone terminal and PDA.

Furthermore, a charge guidance apparatus in accordance with the present invention can be applied to a PND which a person brings into and uses in a vehicle driven by power supplied from a driving battery.

In this case, a configuration is also possible which decides from the detection information of an acceleration sensor incorporated into the PND or mobile phone terminal as to whether the mobile unit is moving or not.

Incidentally, it is to be understood that a free combination of the individual embodiments, variations of any components of the individual embodiments or removal of any components of the individual embodiments are possible within the scope of the present invention.

Industrial Applicability

A charge guidance apparatus in accordance with the present invention can give a user appropriate guidance about the battery charge of an electric vehicle and the like. Accordingly, it is suitable for onboard equipment, particularly for a car navigation system capable of deciding the usual charging spot.

Description of Reference Symbols

1 car body; 2, 2A, 2B, 2C navigation system; 3 GPS receiver; 4 clock unit; 5 storage unit; 6, 6A, 6B, 6C arithmetic unit; 7 input unit; 8 display unit; 9 wheels; 10 charging plug; 11 power converter; 12 charge control unit; 13 battery managing unit; 14 battery; 15 motor control unit; 16 motor; 17 transmission; 18 shaft; 19 vehicle control unit; 20 in-vehicle control bus; 21 position information acquiring unit; 22 timing processing unit; 23 history creation retaining unit; 24 learning processing unit; 25, 25C, 25D decision processing unit; 25a residual quantity decision unit; 25b remaining battery life acquiring unit; 25c threshold retaining unit; 25d parking decision unit; 25e vehicle information acquiring unit; 25f difference calculating unit; 25g charge decision unit; 25h traveled distance calculating unit; 25i power consumption information retaining unit; 25j correction processing unit; 25k power consumption-detection value correspondence information retaining unit; 25k-1 power consumption-weather related information correspondence information retaining unit; 26, 26A charge guidance processing unit; 26a, 26a-1, 26a-2 guidance processing unit; 26b guidance information retaining unit; 26c, 26c-1 charge start check unit; 26d out-vehicle decision unit; 26e communication processing unit; 26e-1 powerline communications processing unit; 26f, 26f-1 communication destination information retaining unit; 27 wireless communication unit; 28 powerline communications modem; 37 temperature sensor; 38 illuminance sensor; 39 raindrop sensor.

What is claimed is:

1. A charge guidance apparatus comprising:
   one or more processors that perform the function of:
   a history creation unit for creating history information about a charging spot, charge start time and charging duration of a driving battery of a vehicle;
   a learning processing unit for extracting the charging spot, charge start time and charging duration of the driving battery of the vehicle with frequency of charges executed being not less than a prescribed number of times from the history information created by the history creation unit, and for learning a usual charging spot and charging period of time of the vehicle from the charging spot, charge start time and charging duration extracted;
   a decision processing unit for deciding whether to give charge guidance or not based on whether the vehicle is in the usual charging spot and charging period of time learned by the learning processing unit; and
   a charge guidance processing unit for giving charge guidance in accordance with a decision result of the decision processing unit, the charge guidance being provided in one or both visual or vocal format.

2. The charge guidance apparatus according to claim 1, wherein
   the charge guidance processing unit gives the charge guidance again if the driving battery charge is not executed even though a prescribed time period has elapsed after giving the charge guidance.

3. The charge guidance apparatus according to claim 1, further comprising:
   a communication unit for communicating with a communication terminal a driver or passenger of the vehicle carries, wherein
   the charge guidance processing unit gives, if no person is detected in the vehicle, the charge guidance by communication between the communication terminal and the communication unit.

4. The charge guidance apparatus according to claim 1, further comprising:
   a communication unit for communicating with an external device, wherein
   the charge guidance processing unit, if no person is detected in the vehicle, gives the charge guidance by communication between the external device and the communication unit, and notifies the external device of a charging state of the driving battery acquired from the vehicle.

5. The charge guidance apparatus according to claim 1, wherein
   the decision processing unit decides that the charge guidance can be given if the vehicle is parked at the usual charging spot learned by the learning processing unit.

6. The charge guidance apparatus according to claim 5, wherein
   the decision processing unit decides that the charge guidance can be given if the vehicle is parked within a prescribed time period before beginning of the usual charging period of time learned by the learning processing unit.

7. The charge guidance apparatus according to claim 1, further comprising:
   an input unit for accepting an information input from an external, wherein
   the learning processing unit uses a charging spot and charging period of time of the vehicle received with the input unit as the usual charging spot and charging period of time of the vehicle.

8. The charge guidance apparatus according to claim 1, further comprising:
   a remaining battery life acquiring unit for acquiring residual power of the driving battery from the vehicle, wherein
   the decision processing unit decides, when the residual power of the driving battery acquired by the remaining battery life acquiring unit is not greater than a prescribed threshold, whether to give charge guidance or not from whether the residual power is greater than power consumption by traveling from the present position of the vehicle to the usual charging spot.

9. The charge guidance apparatus according to claim 8, further comprising:
   a detection unit for detecting a condition of the vehicle, wherein
   the decision processing unit retains correspondence information indicating correspondence between the condition of the vehicle and an amount of power expected to be consumed by operation other than traveling of the vehicle in the condition of the vehicle, and corrects, when deciding whether to give the charge guidance or not, the prescribed threshold and the power consumption by the traveling from the present position of the vehicle to the usual charging spot by referring to the correspondence information in accordance with the condition of the vehicle detected by the detection unit.

10. The charge guidance apparatus according to claim 8, further comprising:
a communication unit for communicating with an external device, wherein
the decision processing unit retains correspondence information indicating correspondence between the condition of the vehicle and an amount of power expected to be consumed by operation other than traveling of the vehicle in the condition of the vehicle, and corrects, when deciding whether to give the charge guidance or not, the prescribed threshold and the power consumption by the traveling from the present position of the vehicle to the usual charging spot by referring to the correspondence information in accordance with the condition of the vehicle acquired from the external device by communication with the communication unit.

11. An onboard navigation system comprising:
a charge guidance apparatus comprised of one or more processors that perform the function of:
a history creation unit for creating history information about a charging spot, charge start time and charging duration of a driving battery of a vehicle;
a learning processing unit for extracting the charging spot, charge start time and charging duration of the driving battery of the vehicle with frequency of charges executed being not less than a prescribed number of times from the history information created by the history creation unit, and for learning a usual charging spot and charging period of time of the vehicle from the charging spot, charge start time and charging duration extracted;
a decision processing unit for deciding whether to give charge guidance or not based on whether the vehicle is in the usual charging spot and charging period of time learned by the learning processing unit; and
a charge guidance processing unit for giving charge guidance in accordance with a decision result of the decision processing unit, the charge guidance being provided in one or both visual or vocal format.

12. The onboard navigation system according to claim 11, wherein
the charge guidance processing unit gives the charge guidance again if the driving battery charge is not executed even though a prescribed time period has elapsed after giving the charge guidance.

13. The onboard navigation system according to claim 11, further comprising:
a communication unit for communicating with a communication telminal a driver or passenger of the vehicle carries, wherein
the charge guidance processing unit gives, if no person is detected in the vehicle, the charge guidance by communication between the communication terminal and the communication unit.

14. The onboard navigation system according to claim 11, further comprising:
a communication unit for communicating with an external device, wherein
the charge guidance processing unit, if no person is detected in the vehicle, gives the charge guidance by communication between the external device and the communication unit, and notifies the external device of a charging state of the driving battery acquired from the vehicle.

15. The onboard navigation system according to claim 11, wherein
the decision processing unit decides that the charge guidance can be given if the vehicle is parked at the usual charging spot learned by the learning processing unit.

16. The onboard navigation system according to claim 15, wherein
the decision processing unit decides that the charge guidance can be given if the vehicle is parked within a prescribed time period before beginning of the usual charging period of time learned by the learning processing unit.

17. The onboard navigation system according to claim 11, further comprising:
an input unit for accepting an information input from an external, wherein
the learning processing unit uses a charging spot and charging period of time of the vehicle received with the input unit as the usual charging spot and charging period of time of the vehicle.

18. The onboard navigation system according to claim 11, further comprising:
a remaining battery life acquiring unit for acquiring residual power of the driving battery from the vehicle, wherein
the decision processing unit decides, when the residual power of the driving battery acquired by the remaining battery life acquiring unit is not greater than a prescribed threshold, whether to give charge guidance or not from whether the residual power is greater than power consumption by traveling from the present position of the vehicle to the usual charging spot.

19. The onboard navigation system according to claim 18, further comprising:
a detection unit for detecting a condition of the vehicle, wherein
the decision processing unit retains correspondence information indicating correspondence between the condition of the vehicle and an amount of power expected to be consumed by operation other than traveling of the vehicle in the condition of the vehicle, and corrects, when deciding whether to give the charge guidance or not, the prescribed threshold and the power consumption by the traveling from the present position of the vehicle to the usual charging spot by referring to the correspondence information in accordance with the condition of the vehicle detected by the detection unit.

20. The onboard navigation system according to claim 18, further comprising:
a communication unit for communicating with an external device, wherein
the decision processing unit retains correspondence information indicating correspondence between the condition of the vehicle and an amount of power expected to be consumed by operation other than traveling of the vehicle in the condition of the vehicle, and corrects, when deciding whether to give the charge guidance or not, the prescribed threshold and the power consumption by the traveling from the present position of the vehicle to the usual charging spot by referring to the correspondence information in accordance with the condition of the vehicle acquired from the external device by communication with the communication unit.

* * * * *